United States Patent [19]

Morizono et al.

[11] Patent Number: 6,015,625
[45] Date of Patent: Jan. 18, 2000

[54] ADHESIVE RESIN COMPOSITION AND LAMINATE MADE USING THE SAME AS ADHESIVE LAYER

[75] Inventors: Kenichi Morizono; Keiji Okada, both of Kuga-gun; Hiromi Shigemoto; Hideshi Kawachi, both of Ichihara, all of Japan

[73] Assignee: Mitsui Chemicals, Inc., Tokyo, Japan

[21] Appl. No.: 09/155,208

[22] PCT Filed: Jan. 27, 1998

[86] PCT No.: PCT/JP98/00213

§ 371 Date: Sep. 24, 1998

§ 102(e) Date: Sep. 24, 1998

[87] PCT Pub. No.: WO98/32809

PCT Pub. Date: Jul. 30, 1998

[30] Foreign Application Priority Data

Jan. 27, 1997 [JP] Japan ..................................... 9-012925
Dec. 9, 1997 [JP] Japan ..................................... 9-338346

[51] Int. Cl.[7] .................................................... B32B 27/00
[52] U.S. Cl. .............................. 428/500; 525/70; 525/71; 525/78; 525/86; 525/88; 525/95; 525/241; 525/437; 428/212; 428/412; 428/483; 428/355 EN
[58] Field of Search ................................. 525/70, 71, 78, 525/86, 88, 95, 241, 437; 428/212, 412, 483, 500, 355 EN

[56] References Cited

U.S. PATENT DOCUMENTS

| | | | |
|---|---|---|---|
| 4,370,388 | 1/1983 | Miro et al. | 428/461 |
| 4,548,985 | 10/1985 | Yazaki et al. | 525/65 |
| 5,055,526 | 10/1991 | Sato et al. | 525/74 |
| 5,089,353 | 2/1992 | Negi et al. | 428/518 |
| 5,198,494 | 3/1993 | Kawachi et al. | 525/71 |
| 5,225,482 | 7/1993 | Nakagawa et al. | 525/71 |
| 5,250,349 | 10/1993 | Nakagawa et al. | 428/212 |
| 5,346,950 | 9/1994 | Negi et al. | 525/57 |

*Primary Examiner*—Samuel A. Acquah
*Attorney, Agent, or Firm*—Sherman and Shalloway

[57] ABSTRACT

An adhesive resin composition contains at least a partially or wholly graft-modified α-olefin/aromatic vinyl compound random copolymer having a graft quantity of an unsaturated carboxylic acid or its derivative ranging from 0.01 to 30% by weight. A laminate comprises (I) a polyester resin layer or a polycarbonate layer, (II) an adhesive layer formed from the above-mentioned adhesive resin composition and (III) a saponified olefin/vinyl acetate copolymer layer. The adhesive resin composition is free from lowering of adhesive strength even when contacted with, for example, hot water. The laminate has excellent gas barrier properties and is capable of being subjected to retorting treatment.

7 Claims, No Drawings

ADHESIVE RESIN COMPOSITION AND LAMINATE MADE USING THE SAME AS ADHESIVE LAYER

FIELD OF THE INVENTION

The present invention relates to adhesive resin compositions and laminates using the compositions for their adhesive layers. More particularly, the invention relates to adhesive resin compositions free from lowering of adhesive strength even when contacted with hot water and to laminates using the compositions, said laminates having excellent gas barrier properties and capable of being subjected to retorting treatment.

BACKGROUND OF THE INVENTION

Polyester resins such as polyethylene terephthalate resin have excellent mechanical strength, rigidity, heat resistance, chemical resistance, oil resistance and transparency. Utilizing these excellent properties, the polyester resins are widely used for forming packaging materials such as films, sheets and containers. The polyester resins, however, have high permeability to gases such as oxygen, and therefore they cannot be used for forming packaging materials requiring high resistance to gas permeation, e.g., those for foods, medicaments and cosmetics.

Also, polycarbonate resins have excellent transparency, heat resistance and retention of scent, but they have high permeability to gases such as oxygen. Therefore, the polycarbonate resins cannot be used for forming packaging materials requiring high resistance to gas permeation, e.g., those for foods.

To improve the gas permeation resistance of the polyester resins and the polycarbonate resins, it has been proposed that a resin superior to the polyester resins and the polycarbonate resins in the gas permeation resistance, such as a saponified ethylene/vinyl acetate copolymer resin, is laminated on those resins. However, the adhesive strength between the polyester or polyester resin and the saponified ethylene/vinyl acetate copolymer resin is not always satisfactory, and this results in such a problem that partial separation takes place when the resins are laminated or the resulting laminate is used, whereby gas permeation resistance is decreased and appearance or mechanical strength of the final product is deteriorated.

To cope with the problem, Japanese Patent Laid-Open Publications No. 270155/1986 and No. 158043/1987 disclose laminates comprising a polycarbonate or polyester layer, an intermediate adhesive layer formed from an ethylene/α-olefin random copolymer having been graft-modified with an unsaturated carboxylic acid or its derivative and a saponified ethylene/vinyl acetate copolymer layer. The laminates not only show high gas permeation resistance but also have excellent adhesion properties at ordinary temperature, but when the laminates are subjected to high-temperature treatment such as hot filling treatment or retorting treatment, the adhesive strength may be decreased to cause separation of layers, resulting in lowering of gas permeation resistance.

Japanese Patent Laid-Open Publication No. 45445/1989 (correspond to U.S. Pat. No. 5,055,526, EP 315418B) applied by the present applicant discloses an adhesive resin composition capable of forming a laminate which is free from lowering of adhesive strength between the layers even after it is subjected to high-temperature treatment such as hot filling treatment or retorting treatment, and also discloses a laminate using the composition.

This adhesive resin composition comprises:
- (a) an ethylene/α-olefin copolymer having a melt flow rate of 0.1 to 50 g/10 min, a density of 0.850 to 0.900 g/cM$^3$, an ethylene content of 75 to 95% by mol and a crystallinity (measured by X-ray diffractometry) of less than 30%, in an amount of 95 to 50% by weight,
- (b) an ethylene/vinyl acetate copolymer having a melt flow rate of 0.1 to 50 g/10 min and a vinyl acetate content of 5 to 40% by weight, in an amount of 5 to 50% by weight, and
- (c) a partially or wholly graft-modified ethylene/aromatic vinyl compound copolymer having a graft quantity of an unsaturated carboxylic acid or its derivative ranging from 0.05 to 15% by weight, a melt flow rate of 0.1 to 50 g/10 min, a density of 0.900 to 0.980 g/cm$^3$ and a crystallinity (measured by X-ray diffractometry) of not less than 30%, in an amount of 1.0 to 30% by weight based on 100% by weight of the total amount of the components (a) and (b), said composition having a graft ratio of 0.01 to 3% by weight, a melt flow rate (MFR) of 0.1 to 50 g/10 min and a crystallinity of less than 35%.

The laminate disclosed in the above publication comprises a polyester or polycarbonate layer, an intermediate layer formed from the above-mentioned adhesive resin composition and a saponified olefin/vinyl acetate copolymer layer.

Though the adhesive resin composition mentioned above has excellent adhesion properties at ordinary temperature after high-temperature treatment, the laminate using the composition occasionally suffers separation of layers when it is subjected to hot filling treatment or retorting treatment.

Accordingly, there has been desired development of adhesive resin compositions by the use of which layer-separation of laminates can be inhibited even when the laminates are subjected to hot filling treatment or retorting treatment.

It is an object of the present invention to provide an adhesive resin composition which can keep practical adhesive strength at ordinary temperature after high-temperature treatment and has excellent thermoresistance adhesion properties at high temperatures so that layer-separation of a laminate using the composition can be inhibited when the laminate is subjected to severe treatment such as hot filling treatment or retorting treatment.

It is another object of the invention to provide a laminate which comprises a polycarbonate or polyester resin layer, a layer of the above-mentioned adhesive resin composition as an adhesive layer and a saponified ethylene/vinyl acetate copolymer layer, and which has excellent gas permeation resistance and is free from separation of layers when subjected to hot filling treatment or retorting treatment.

DISCLOSURE OF THE INVENTION

The adhesive resin composition according to the present invention contains at least a partially or wholly graft-modified α-olefin/aromatic vinyl compound random copolymer having a graft quantity of an unsaturated carboxylic acid or its derivative ranging from 0.01 to 30% by weight.

The adhesive resin composition according to the invention is, for example, a composition comprising:
- (A) a partially or wholly graft-modified α-olefin/aromatic vinyl compound random copolymer having a graft quantity of an unsaturated carboxylic acid or its derivative ranging from 0.01 to 30% by weight, in an amount of 1 to 80 parts by weight, and
- (B) at least one soft polymer selected from an ethylene/α-olefin copolymer, in which the molar ratio of constituent units derived from ethylene to constituent units derived from an α-olefin of 3 to 20 carbon atoms is in the range of 45/55 (ethylene/α-olefin) to 95/5, and an ethylene/vinyl acetate copolymer having a vinyl acetate content of 5 to 40% by weight, in an amount of 20 to 99 parts by weight, the total amount of said components (A) and (B) being 100 parts by weight.

The adhesive resin composition according to the invention may further contain an ethylene polymer or its modified product, and/or a propylene polymer or its modified product, in an amount of 0.1 to 50 parts by weight based on 100 parts by weight of the total amount of the partially or wholly modified α-olefin/aromatic vinyl compound random copolymer (A) and the soft polymer (B).

The adhesive resin composition of the invention can be favorably used as an adhesive for producing a laminate for a retort packaging material or a hot fill packaging material.

The first laminate according to the present invention comprises:

(I) a polyester resin layer, (II) an adhesive layer formed from the above-mentioned adhesive resin composition, and (III) a saponified olefin/vinyl acetate copolymer layer.

The second laminate according to the present invention comprises:

(I) a polycarbonate layer, (II) an adhesive layer formed from the above-mentioned adhesive resin composition, and (III) a saponified olefin/vinyl acetate copolymer layer.

The retort packaging material or the hot fill packaging material according to the present invention is formed from the above-mentioned laminate.

BEST MODE FOR CARRYING OUT THE INVENTION

The adhesive resin composition according to the invention and the laminate using the composition are described in detail hereinafter.

First, the adhesive resin composition is explained.

The adhesive resin composition of the invention contains a graft-modified α-olefin/aromatic vinyl compound random copolymer as its major component, and contains as other component a soft polymer such as an ethylene/α-olefin copolymer or an ethylene/vinyl acetate copolymer. These components are described below.

Graft-Modified α-Olefin/Aromatic Vinyl Compound Random Copolymer

The graft-modified α-olefin/aromatic vinyl compound random copolymer (sometimes referred to simply as "modified copolymer" hereinafter) for use in the invention is one obtained by partially or wholly graft-modifying an α-olefin/aromatic vinyl compound random copolymer with an unsaturated carboxylic acid or its derivative.

The α-olefin/aromatic vinyl compound random copolymer, that is a starting material for preparing the graft-modified α-olefin/aromatic vinyl compound random copolymer, is a random copolymer of ethylene and an aromatic vinyl compound (ethylene/aromatic vinyl compound copolymer) or a random copolymer of ethylene, an α-olefin of 3 to 20 carbon atoms and an aromatic vinyl compound (ethylene/α-olefin/aromatic vinyl compound copolymer).

In the ethylene/aromatic vinyl compound copolymer, the amount of constituent units derived from ethylene is in the range of 99.95 to 70% by mol, preferably 99.90 to 80% by mol, more preferably 99.00 to 88% by mol; and the amount of constituent units derived from the aromatic vinyl compound is in the range of 0.05 to 30% by mol, preferably 0.10 to 20% by mol, more preferably 1.00 to 12% by mol.

When the amount of the constituent units derived from the aromatic vinyl compound is smaller than the lower limit of the above range, heat resistance and adhesion properties of the resulting composition are occasionally lowered. When the amount of the constituent units derived from the aromatic vinyl compound is larger than the upper limit of the above range, heat resistance and adhesion properties of the resulting composition are occasionally lowered.

Examples of the aromatic vinyl compounds include styrene; mono- or polyalkylstyrenes, such as o-methylstyrene, m-methylstyrene, p-methylstyrene, o,p-dimethylstyrene, o-ethylstyrene, m-ethylstyrene and p-ethylstyrene; functional group-containing styrene derivatives, such as methoxystyrene, ethoxystyrene, vinylbenzoic acid, methyl vinylbenzoate, vinylbenzyl acetate, hydroxystyrene, o-chlorostyrene, p-chlorostyrene and divinylbenzene; 3-phenylpropylene; 4-phenylbutene; and α-methylstyrene. Of these, preferable are styrene and 4-methoxystyrene.

In the ethylene/aromatic vinyl compound copolymer, α-olefins other than ethylene and the aromatic vinyl compound may be copolymerized. Examples of the α-olefins include α-olefins of 3 to 20 carbon atoms, such as propylene, 1-butene, 3-methyl-1-butene, 4-methyl-1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene and 1-eicosene. Of these, preferable are 1-butene, 1-pentene, 1-hexene and 1-octene. These α-olefins can be used singly or in combination or two or more kinds.

In the ethylene/α-olefin/aromatic vinyl compound copolymer, the molar ratio of constituent units derived from ethylene to constituent units derived from the α-olefin of 3 to 20 carbon atoms is in the range of 99/1 (ethylene/α-olefin) to 70/30, preferably 99/1 to 80/20, more preferably 99/1 to 90/10;

the total amount of the constituent units derived from ethylene and the constituent units derived from the α-olefin of 3 to 20 carbon atoms is in the range of 99.95 to 70% by mol, preferably 99.90 to 80% by mol, more preferably 99.00 to 88% by mol; and the amount of the constituent units derived from the aromatic vinyl compound is in the range of 0.05 to 30% by mol, preferably 0.10 to 20% by mol, more preferably 0.10 to 12% by mol.

The amount of the constituent units derived from ethylene, the amount of the constituent units derived from the α-olefin of 3 to 20 carbon atoms and the amount of the constituent units derived from the aromatic vinyl compound are each in the above range, the resulting composition has excellent heat resistance and adhesion properties.

In the α-olefin/aromatic vinyl compound random copolymer, other monomers such as non-conjugated dienes may be copolymerized. Examples of the non-conjugated dienes include 1,4-pentadiene, 1,4-hexadiene, 4-methyl-1,5-heptadiene, 5-methylene-2-norbornene, 5-ethylidene-2-norbornene, 5-isopropenyl-2-norbornene, 2,5-norbornadiene, 1,6-cyclooctadiene, 2-ethylene-2,5-norbornadiene, 2-isopropenyl-2,5-norbornadiene, dicyclopentadiene, 1,6-octadiene, 1,7-octadiene, tricyclopentadiene, and esters of dihydrodicyclopentadienyloxyethylene and unsaturated carboxylic acids (e.g., acrylic acid, methacrylic acid, itaconic acid, maleic acid and fumaric acid). These non-conjugated dienes can be used singly or in combination of two or more kinds.

The α-olefin/aromatic vinyl compound random copolymer desirably has an intrinsic viscosity [η], as measured in decalin at 135° C., of 0.1 to 10 dl/g, preferably 0.5 to 8 dl/g, more preferably 1 to 5 dl/g. Further, it is desired that the temperature (Tm) at the maximum peak position in the endothermic curve of the α-olefin/aromatic vinyl compound copolymer, as measured by a differential scanning calorimeter, is in the range of 60 to 125° C., preferably 70 to 110° C. In this case, an adhesive resin composition having excellent heat resistance can be obtained.

In the α-olefin/aromatic vinyl compound random copolymer, the proportion of the sequences of at least two constituent units derived from the aromatic vinyl compound to all the constituent units derived from the aromatic vinyl compound is desired to be not more than 1%, preferably not more than 0.1%. The proportion of the sequences of at least two constituent units derived from the aromatic vinyl compound can be determined by means of $^{13}C$-NMR When the α-olefin/aromatic vinyl compound random copolymer is an ethylene/aromatic vinyl compound copolymer, it is desired that the B value, as determined by a $^{13}C$-NMR spectrum of the copolymer and the following equation, is in the range of 0.80 to 2.00, preferably 0.90 to 1.50, more preferably 0.95 to 1.45, particularly preferably 1.00 to 1.40.

$$B=[P_{SE}]/(2 \cdot [P_E] \cdot [P_S])$$

wherein $[P_E]$ is a molar fraction of the constituent units derived from ethylene (ethylene units) in the ethylene/aromatic vinyl compound copolymer, $[P_S]$ is a molar fraction the constituent units derived from the aromatic vinyl compound (aromatic vinyl compound units) in the ethylene/aromatic vinyl compound copolymer, and $[P_{SE}]$ is a proportion of the number of ethylene unit-aromatic vinyl compound unit sequences to the number of all the dyad sequences in the ethylene/aromatic vinyl compound copolymer.

The B value is an index of distribution of the ethylene units and the aromatic vinyl compound units in the copolymer, and can be determined in accordance with the reports by J. C. Randall (Macromolecules, 15, 353 (1982)) and J. Ray (Macromolecules, 10, 773 (1977)).

As the B value becomes larger, the block-like sequences of the ethylene units or the aromatic vinyl compound units become shorter. This means that the distribution of the ethylene units and the aromatic vinyl compound units is uniform. When the B value is smaller than 1.00, the distribution of the ethylene units and the aromatic vinyl compound units is not uniform, and the block-like sequences of the ethylene units or the aromatic vinyl compound units become long.

Next, a process for preparing the α-olefin/aromatic vinyl compound random copolymer is described.

The α-olefin/aromatic vinyl compound random copolymer for use in the invention can be prepared by copolymerizing Examples of the ligands having a cyclopentadienyl skeleton include alkyl or cycloalkyl substituted cyclopentadienyl groups, such as cyclopentadienyl, methylcyclopentadienyl, ethylcyclopentadienyl, n- or i-propylcyclopentadienyl, n-, i-, sec- or t-butylcyclopentadienyl, hexylcyclopentadienyl, octylcyclopentadienyl, dimethylcyclopentadienyl, trimethylcyclopentadienyl, tetramethylcyclopentadienyl, pentamethylcyclopentadienyl, methylethylcyclopentadienyl, methylpropylcyclopentadienyl, methylbutylcyclopentadienyl, methylhexylcyclopentadienyl, methylbenzylcyclopentadienyl, ethylbutylcyclopentadienyl, ethylhexylcyclopentadienyl and methylcyclohexylcyclopentadienyl.

Further, an indenyl group, a 4,5,6,7-tetrahydroindenyl group and a fluorenyl group can be also mentioned.

Those groups may be substituted with halogen atoms or trialkylsilyl groups.

Of the above ligands, particularly preferred are alkyl substituted cyclopentadienyl groups.

When the compound represented by the formula (1) has two or more ligands L having a cyclopentadienyl skeleton, two of the ligands having a cyclopentadienyl skeleton may be bonded to each other through an alkylene group such as ethylene or propylene, a substituted alkylene group such as isopropylidene and diphenylmethylene, a silylene group, or a substituted silylene group such as dimethylsilylene, diphenylsilylene or methylphenylsilylene. ethylene, the aromatic vinyl compound, and if necessary, an α-olefin of 3 to 20 carbon atoms, in the presence of, for example, a metallocene catalyst (a).

As the metallocene catalyst (a), various metallocene type catalysts, such as those currently used as single site catalysts and those analogous thereto, can be employed without specific limitation. In particular, a catalyst comprising a metallocene compound (b) of a transition metal (transition metal compound), and an organoaluminum oxy-compound (c) and/or an ionizing ionic compound (d) is preferably employed.

The metallocene compound (b) is, for example, a metallocene compound of a transition metal selected from Group 4 of the periodic table (long-form periodic table) of elements indicated by Group No. 1 to 18 according to IUPAC Inorganic Nomenclature Rules, revised edition, (1989), specifically a metallocene compound represented by the following formula (1).

$$ML_x \qquad (1)$$

In the formula (1), M is a transition metal selected from elements of Group 4 of the periodic table, e.g., zirconium, titanium or hafnium, and x is a valence of the transition metal.

L is a ligand coordinated to the transition metal. At least one ligand L is a ligand having a cyclopentadienyl skeleton which may have a substituent.

Examples of L other than the ligand having a cyclopentadienyl skeleton include a hydrocarbon group of 1 to 12 carbon atoms, an alkoxyl group, an aryloxy group, a sulfonic acid-containing group ($—SO_3R^1$), a halogen atom or hydrogen atom, where $R^1$ is an alkyl group, an alkyl group substituted with a halogen atom, an aryl group, or an aryl group substituted with a halogen atom or an alkyl group.

Examples of the hydrocarbon groups of 1 to 12 carbon atoms include alkyl groups, cycloalkyl groups, aryl groups and aralkyl groups, more specifically, there can be mentioned:

alkyl groups, such as methyl, ethyl, n-propyl, isopropyl, n-butyl, isobutyl, sec-butyl, t-butyl, pentyl, hexyl, octyl, decyl and dodecyl;

cycloalkyl groups, such as cyclopentyl and cyclohexyl;

aryl groups, such as phenyl and tolyl; and aralkyl group, such as benzyl and neophyl.

Examples of the alkoxy groups include methoxy, ethoxy, n-propoxy, isopropoxy, n-butoxy, isobutoxy, sec-butoxy, t-butoxy, pentoxy, hexoxy and octoxy.

The aryloxy group is, for example, phenoxy.

Examples of the sulfonic acid-containing group ($-SO_3R^1$) include methanesulfonato, p-toluenesulfonato, trifluoromethansulfonate and p-chlorobenzenesulfonato.

Examples of the halogen atoms include fluorine, chlorine, bromine and iodine.

The metallocene compound of the above formula wherein the valence of the transition metal is 4 is more specifically represented by the following formula (2):

wherein M is the above-mentioned transition metal, preferably zirconium or titanium, $R^2$ is a group (ligand) having a cyclopentadienyl skeleton, $R^3$, $R^4$ and $R^5$ may be the same or different, and are each independently a group having a cyclopentadienyl skeleton or the same as L other than the ligand having a cyclopentadienyl skeleton in the above formula (1), k is an integer of not less than 1, and k+l+m+n=4.

Further, a bridge type transition metal compound (metallocene compound) represented by the following formula (A) is also employable.

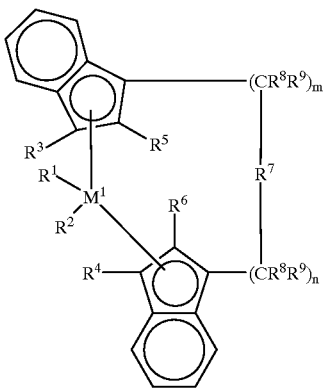

In the formula (A), $M^1$ is a metal of Group IVB of the periodic table, e.g., titanium, zirconium or hafnium.

$R^1$ and $R^2$ may be the same or different, and are each hydrogen, an alkyl group of 1 to 10, preferably 1 to 3 carbon atoms, an alkoxy group of 1 to 10, preferably 1 to 3 carbon atoms, an aryl group of 6 to 10, preferably 6 to 8 carbon atoms, an aryloxy group of 6 to 10, preferably 6 to 8 carbon atoms, an alkenyl group of 2 to 10, preferably 2 to 4 carbon atoms, an arylalkyl group of 7 to 40, preferably 7 to 10 carbon atoms, an alkylaryl group of 7 to 40, preferably 7 to 12 carbon atoms, an arylalkenyl group of 8 to 40, preferably 8 to 12 carbon atoms, or a halogen atom, preferably chlorine.

$R^3$ and $R^4$ may be the same or different, and are each hydrogen, a halogen atom, preferably fluorine, chlorine or bromine, an alkyl group of 1 to 10, preferably 1 to 4 carbon atoms which may be halogenated, an aryl group of 6 to 10, preferably 6 to 8 carbon atoms which may be halogenated, or a group of $-NR^{10}_2$, $-SR^{10}$, $-OSiR^{10}_3$, $-SiR^{10}_3$ or $-PR^{10}_2$, where $R^{10}$ is a halogen atom, preferably chlorine, an alkyl group of 1 to 10, preferably 1 to 3 carbon atoms, or an aryl group of 6 to 10, preferably 6 to 8 carbon atoms.

$R^3$ and $R^4$ are each particularly preferably hydrogen.

$R^5$ and $R^6$ may be the same or different, preferably the same, and are the same as described for $R^3$ and $R^4$ except that each of $R^5$ and $R^6$ is not hydrogen. $R^5$ and $R^6$ are each preferably an alkyl group of 1 to 4 carbon atoms which may be halogenated, for example, methyl, ethyl, propyl, isopropyl, butyl, isobutyl or trifluoromethyl, preferably methyl.

$R^7$ is

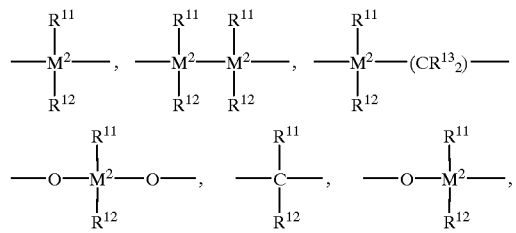

$=BR^{11}$, $=AlR^{11}$, $-Ge-$, $-Sn-$, $-O-$, $-S-$, $=SO$, $=SO_2$, $=NR^{11}$, $=CO$, $=PR^{11}$ or $=P(O)R^{11}$, where $R^{11}$, $R^{12}$ and $R^{13}$ may be the same or different, and are each hydrogen, a halogen atom, an alkyl group of 1 to 10, preferably 1 to 4 carbon atoms, more preferably methyl, a fluoroalkyl group of 1 to 10 carbon atoms, preferably $CF_3$, an aryl group of 6 to 10, preferably 6 to 8 carbon atoms, a fluoroaryl group of 6 to 10 carbon atoms, preferably pentafluorophenyl, an alkoxy group of 1 to 10, preferably 1 to 4 carbon atoms, particularly preferably methoxy, an alkenyl group of 2 to 10, preferably 2 to 4 carbon atoms, an arylalkyl group of 7 to 40, preferably 7 to 10 carbon atoms, an arylalkenyl group of 8 to 40, preferably 8 to 12 carbon atoms, or an alkylaryl group of 7 to 40, preferably 7 to 12 carbon atoms, or $R^{11}$ and $R^{12}$, or $R^{11}$ and $R^{13}$ may form a ring together with the atoms to which they are bonded.

$M^2$ is silicon, germanium or tin, preferably silicon or germanium.

$R^7$ is preferably $=CR^{11}R^{12}$, $=SiR^{11}R^{12}$, $=GeR^{11}R^{12}$, $-O-$, $-S-$, $=SO$, $=PR^{11}$ or $=P(O)R^{11}$.

$R^8$ and $R^9$ may be the same or different, and are the same as described for $R^{11}$.

m and n may be the same or different, and are each 0, 1 or 2, preferably 0 or 1, and m+n is 0, 1 or 2, preferably 0 or 1.

Particularly preferred metallocene compounds satisfying the above conditions are compounds represented by the following formulas (i) to (iii).

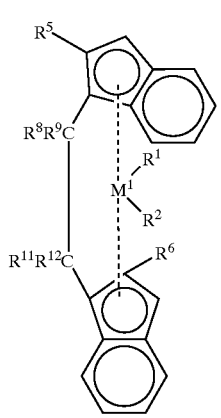

-continued

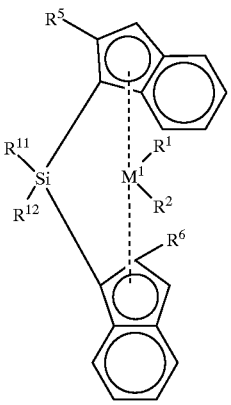

(ii)

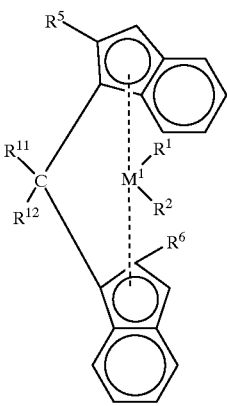

(iii)

In the above formulas (i), (ii) and (iii), $M^1$ is Zr or Hf, $R^1$ and $R^2$ are each methyl or chlorine, $R^5$ and $R^6$ are each methyl, ethyl or trifluoromethyl, and $R^8$, $R^9$, $R^{11}$ and $R^{12}$ are the same as each described above.

Of the compounds represented by the formulas (i), (ii) and (iii), particularly preferred are the following compounds:

rac-dimethylmethylene-bis(indenyl)zirconium dichloride,
rac-dimethylmethylene-bis(2-methyl-1-indenyl)zirconium dichloride,
rac-diphenylmethylene-bis(2-methyl-1-indenyl)zirconium dichloride,
rac-ethylene-bis(2-methyl-1-indenyl)zirconium dichloride,
rac-dimethylsilylene-bis(2-methyl-1-indenyl)zirconium dichloride,
rac-dimethylsilylene-bis(2-methyl-1-indenyl)zirconium dimethyl,
rac-ethylene-bis(2-methyl-1-indenyl)zirconium dimethyl,
rac-phenyl(methyl)silylene-bis(2-methyl-1-indenyl)zirconium dichloride,
rac-diphenyl-silylene-bis(2-methyl-1-indenyl)zirconium dichloride,
rac-methylethylene-bis(2-methyl-1-indenyl)zirconium dichloride, and
rac-dimethylsilylene-bis(2-ethyl-1-indenyl)zirconium dichloride.

These metallocene compounds can be prepared by conventionally known processes (see, for example, Japanese Patent Laid-Open Publication No. 268307/1992 corresponding to EP 485822).

In the present invention, a bridge type transition metal compound (metallocene compound) represented by the following formula (B) is also employable.

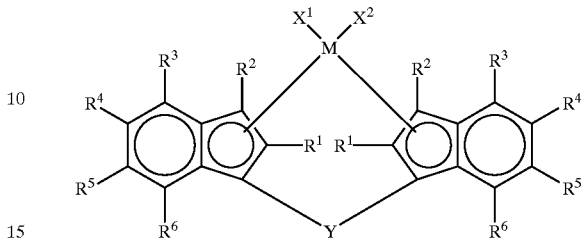

(B)

In the formula (B), M is a transition metal atom of Group IVB of the periodic table, specifically, titanium, zirconium or hafnium.

$R^1$ and $R^2$ are each independently hydrogen, a halogen atom, a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group or a phosphorus-containing group.

Examples of the halogen atoms include fluorine, chlorine, bromine and iodine.

Examples of the hydrocarbon groups of 1 to 20 carbon atoms include alkyl groups, such as methyl, ethyl, propyl, butyl, hexyl, cyclohexyl, octyl, nonyl, dodecyl, eicosyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenyl, naphthyl, methylnaphthyl, anthracenyl and phenanthryl.

Examples of the halogenated hydrocarbon groups include the above-exemplified hydrocarbon groups which are substituted with halogen atoms.

Examples of the silicon-containing groups include monohydrocarbon-substituted silyls, such as methylsilyl and phenylsilyl; dihydrocarbon-substituted silyls, such as dimethylsilyl and diphenylsilyl; trihydrocarbon-substituted silyls, such as trimethylsilyl, triethylsilyl, tripropylsilyl, tricyclohexylsilyl, triphenylsilyl, dimethylphenylsilyl, methyldiphenylsilyl, tritolylsilyl and trinaphthylsilyl;

silyl ethers of hydrocarbon-substituted silyls, such as trimethylsilyl ether;

silicon-substituted alkyl groups, such as trimethylsilylmethyl; and silicon-substituted aryl groups, such as trimethylsililphenyl.

Examples of the oxygen-containing groups include hydroxy groups; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

Examples of the sulfur-containing groups include those wherein oxygen is replaced with sulfur in the above-exemplified oxygen-containing group.

Examples of the nitrogen-containing groups include amino group; alkylamino groups, such as methylamino, dimethylamino, diethylamino, dipropylamino, dibutylamino and dicyclohexylamino; and arylamino or alkylarylamino groups, such as phenylamino, diphenylamino, ditolylamino, dinaphthylamino and methylphenylamino.

Examples of the phosphorus-containing groups include phosphino groups, such as dimethylphosphino and diphenylphosphino.

Of these, $R^1$ is preferably a hydrocarbon group, particularly preferably a hydrocarbon group of 1 to 3 carbon atoms (methyl, ethyl or propyl). $R^2$ is preferably hydrogen or a hydrocarbon group, particularly preferably hydrogen or a hydrocarbon group of 1 to 3 carbon atoms (methyl, ethyl or propyl).

$R^3$, $R^4$, $R^5$ and $R^6$ are each independently hydrogen, a halogen atom, a hydrocarbon group of 1 to 20 carbon atoms or a halogenated hydrocarbon group of 1 to 20 carbon atoms. Of these, preferred is hydrogen, the hydrocarbon group or the halogenated hydrocarbon group. At least one combination of $R^3$ and $R^4$, $R^4$ and $R^5$, or $R^5$ and $R^6$ may form a monocyclic aromatic ring together with the carbon atoms to which they are bonded.

When there are two or more hydrocarbon groups or halogenated hydrocarbon groups, excluding the groups for forming the aromatic ring, they may be bonded to each other to form a ring. When $R^6$ is a substituent other than the aromatic group, it is preferably hydrogen.

Examples of the halogen atoms, the hydrocarbon groups of 1 to 20 carbon atoms and the halogenated hydrocarbon groups of 1 to 20 carbon atoms are those described for $R^1$ and $R^2$.

As the ligand which contains a monocyclic aromatic ring formed by at least one combination of $R^3$ and $R^4$, $R^4$ and $R^5$, or $R^5$ and $R^6$, as mentioned above, and is coordinated to M, there can be mentioned the following ones.

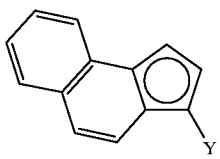

(1)

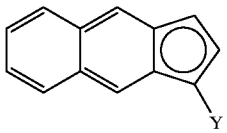

(2)

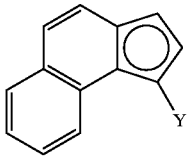

(3)

Of these, preferred is the ligand represented by the formula (1).

The aromatic ring mentioned above may be substituted with a halogen atom, a hydrocarbon group of 1 to 20 carbon atoms or a halogenated hydrocarbon group of 1 to 20 carbon atoms.

Examples o f the halogen at oms, the hydrocarbon groups of 1 to 20 carbon atoms and the halogenatted hydrocarbon groups of 1 to 20 carbon atoms for substituting the aromatic ring are those described for $R^1$ and $R^2$.

$X^1$ and $X^2$ are each independently hydrogen, a halogen atom, a hydrocarbon group of 1 to 20 carbon atoms, a halogenated hydrocarbon group of 1 to 20 carbon atoms, an oxygen-containing group or a sulfur-containing group.

Examples of the halogen atoms, the hydrocarbon groups of 1 to 20 carbon atoms, the halogenated hydrocarbon groups of 1 to 20 carbon atoms and the oxygen-containing groups are those described for $R^1$ and $R^2$.

Examples of the sulfur-containing groups include those described for $R^1$ and $R^2$; and further sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; and sulfinato groups, such as methylsulfinato, phenylsulfinato, benzylsulfinato, p-toluenesulfinato, trimethylbenzenesulfinato and pentafluorobenzenesulfinato.

Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, $-O-$, $-CO-$, $-S-$, $-SO-$, $-SO_2-$, $-NR^7-$, $-P(R^7)-$, $-P(O)(R^7)-$, $-BR^7-$ or $-AlR^7-$, where $R^7$ is hydrogen, a halogen atom, a hydrocarbon group of 1 to 20 carbon atoms or a halogenated hydrocarbon group of 1 to 20 carbon atoms.

Examples of the divalent hydrocarbon groups of 1 to 20 carbon atoms include alkylene groups, such as methylene, dimethylmethylene, 1,2-ethylene, dimethyl-1,2-ethylene, 1,3-trimethylene, 1,4-tetramethylene, 1,2-cyclohexylene and 1,4-cyclohexylene, and arylalkylene groups, such as diphenylmethylene and diphenyl-1,2-ethylene.

Examples of the divalent halogenated hydrocarbon groups include the above-mentioned divalent hydrocarbon groups of 1 to 20 carbon atoms, which are halogenated, such as chloromethylene.

Examples of the divalent silicon-containing groups include alkylsilylene, alkylarylsilylene and arylsilylene groups, such as methylsilylene, dimethylsilylene, diethylsilylene, di(n-propyl)silylene, di(i-propyl) silylene, di(cyclohexyl)silylene, methylphenylsilylene, diphenylsilylene, di(p-tolyl)silylene and di(p-chlorophenyl) silylene; and alkyldisilylene, alkylaryldisilylene and aryldisilylene groups, such as tetramethyl-1,2-disilylene and tetraphenyl-1,2-disilylene.

Examples of the divalent germanium-containing groups include those wherein silicon is replaced with germanium in the above-mentioned divalent silicon-containing groups.

Examples of the divalent tin-containing groups include those wherein silicon is replaced with tin in the above-mentioned divalent silicon-containing groups.

$R^7$ is a halogen atom, a hydrocarbon group of 1 to 20 carbon atoms or a halogenated hydrocarbon group of 1 to 20 carbon atoms, examples of which are those described for $R^1$ and $R^2$.

Of the above groups, preferred are divalent silicon-containing groups, divalent germanium-containing groups and divalent tin-containing group, and more preferred are divalent silicon-containing groups. Of these, particularly preferred are alkylsilylene, alkylarylsilylene and arylsilylene.

Listed below are examples of the transition metal compounds represented by the formula (B).

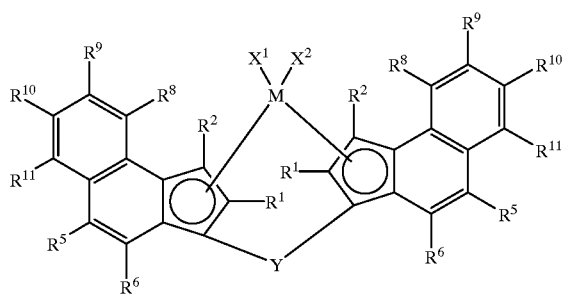

| R¹ | R² | R⁵ | R⁶ | R⁸ | R⁹ | R¹⁰ | R¹¹ | Y | X¹ | X² | M |
|---|---|---|---|---|---|---|---|---|---|---|---|
| H | H | H | H | H | H | H | H | SiMe₂ | Cl | Cl | Zr |
| CH₃ | H | H | H | H | H | H | H | SiMe₂ | Cl | Cl | Zr |
| CH₃ | H | H | H | H | H | H | H | SiMePh | Cl | Cl | Zr |
| CH₃ | H | H | H | H | H | H | H | SiPh₂ | Cl | Cl | Zr |
| CH₃ | H | H | H | H | H | H | H | Si(p-tolyl)₂ | Cl | Cl | Zr |
| CH₃ | H | H | H | H | H | H | H | Si(pClPh)₂ | Cl | Cl | Zr |
| CH₃ | H | H | H | H | H | H | H | C₂H₅ | Cl | Cl | Zr |
| CH₃ | H | H | H | H | H | H | H | GeMe₂ | Cl | Cl | Zr |
| CH₃ | H | H | H | H | H | H | H | SnMe₂ | Cl | Cl | Zr |
| CH₃ | H | H | H | H | H | H | H | SiMe₂ | Br | Br | Zr |
| CH₃ | H | H | H | H | H | H | H | SiMe₂ | Cl | OSO₂CH₃ | Zr |
| CH₃ | H | H | H | H | H | H | H | SiMe₂ | Cl | SO₂CH₃ | Zr |
| CH₃ | H | H | H | H | H | H | H | SiMe₂ | Cl | Cl | Ti |
| CH₃ | H | H | H | H | H | H | H | SiMe₂ | Cl | Cl | Hf |
| C₂H₅ | H | H | H | H | H | H | H | SiMe₂ | Cl | Cl | Zr |
| nC₃H₇ | H | H | H | H | H | H | H | SiMe₂ | Cl | Cl | Zr |
| Ph | H | H | H | H | H | H | H | SiMe₂ | Cl | Cl | Zr |
| CH₃ | CH₃ | H | H | H | H | H | H | SiMe₂ | Cl | Cl | Zr |
| CH₃ | CH₃ | H | H | H | H | H | H | SiPh₂ | Cl | Cl | Zr |
| CH₃ | CH₃ | CH₃ | H | H | H | H | H | SiMe₂ | Cl | Cl | Zr |
| CH₃ | H | Cl | H | H | H | H | H | SiMe₂ | Cl | Cl | Zr |
| CH₃ | H | CH₃ | H | H | H | H | H | SiMe₂ | Cl | Cl | Zr |
| CH₃ | H | C₂H₅ | H | H | H | H | H | SiMe₂ | Cl | Cl | Zr |
| CH₃ | H | Ph | H | H | H | H | H | SiMe₂ | Cl | Cl | Zr |
| CH₃ | H | H | CH₃ | H | H | H | H | SiMe₂ | Cl | Cl | Zr |
| CH₃ | H | CH₃ | CH₃ | H | H | H | H | SiMe₂ | Cl | Cl | Zr |
| CH₃ | H | CH₂*¹ | CH₃ | H | H | H | CH₂*¹ | SiMe₂ | Cl | Cl | Zr |
| CH₃ | H | H | H | H | H | H | Ph | SiMe₂ | Cl | Cl | Zr |

*¹R⁵ and R¹¹ are bonded to each other to form a five-membered ring.
Me: methyl;
Et: ethyl;
Ph: phenyl.

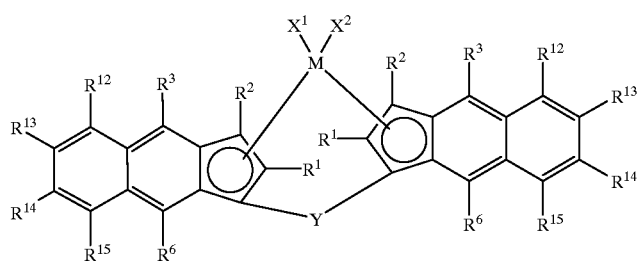

| R¹ | R² | R³ | R⁶ | R¹² | R¹³ | R¹⁴ | R¹⁵ | Y | X¹ | X² | M |
|---|---|---|---|---|---|---|---|---|---|---|---|
| H | H | H | H | H | H | H | H | SiMe₂ | Cl | Cl | Zr |
| CH₃ | H | H | H | H | H | H | H | SiMe₂ | Cl | Cl | Zr |
| CH₃ | H | H | H | H | H | H | H | SiPh₂ | Cl | Cl | Zr |
| CH₃ | CH₃ | H | H | H | H | H | H | SiMe₂ | Cl | Cl | Zr |
| CH₃ | H | CH₃ | H | H | H | H | H | SiMe₂ | Cl | Cl | Zr |
| CH₃ | H | CH₃ | CH₃ | H | H | H | H | SiMe₂ | Cl | Cl | Zr |

-continued

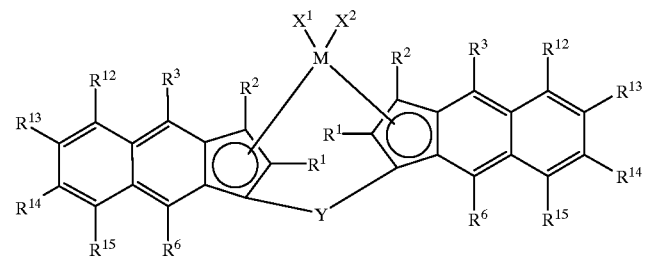

| R¹ | R² | R³ | R⁶ | R¹² | R¹³ | R¹⁴ | R¹⁵ | Y | X¹ | X² | M |
|---|---|---|---|---|---|---|---|---|---|---|---|
| CH₃ | H | CH₂*² | CH₂*² | CH₂*² | H | H | CH₂*² | SiMe₂ | Cl | Cl | Zr |
| CH₃ | H | CH₃ | CH₃ | CH₃ | H | H | CH₃ | SiMe₂ | Cl | Cl | Zr |

*²R³ and R¹², and R⁶ and R¹⁵ are bonded to each other to form a five-memebered ring, respectively.
Me: methyl;
Ph: phenyl

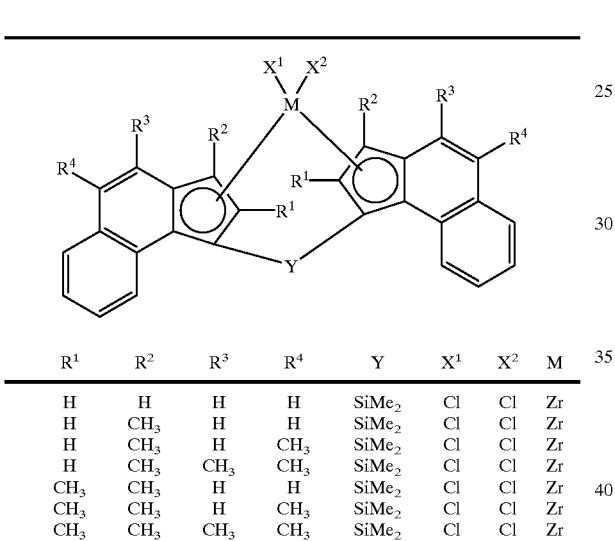

| R¹ | R² | R³ | R⁴ | Y | X¹ | X² | M |
|---|---|---|---|---|---|---|---|
| H | H | H | H | SiMe₂ | Cl | Cl | Zr |
| H | CH₃ | H | H | SiMe₂ | Cl | Cl | Zr |
| H | CH₃ | H | CH₃ | SiMe₂ | Cl | Cl | Zr |
| H | CH₃ | CH₃ | CH₃ | SiMe₂ | Cl | Cl | Zr |
| CH₃ | CH₃ | H | H | SiMe₂ | Cl | Cl | Zr |
| CH₃ | CH₃ | H | CH₃ | SiMe₂ | Cl | Cl | Zr |
| CH₃ | CH₃ | CH₃ | CH₃ | SiMe₂ | Cl | Cl | Zr |

Me: methyl.

Also employable in the invention are transition metal compounds wherein zirconium is replaced with titanium or hafnium in the above-mentioned compounds.

The transition metal compounds mentioned above are used generally in the form of racemic modification as the olefin polymerization catalyst component, but they can be used also in the form of R type or S type.

The indene derivative ligands for the transition metal compounds can be synthesized in accordance with ordinary organic synthesis through, for example, the reaction route described below.

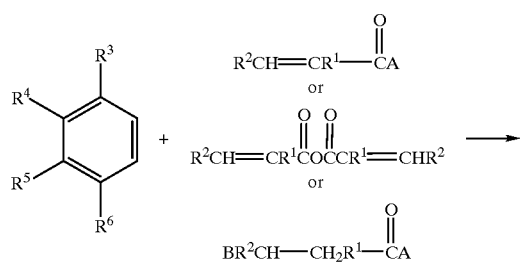

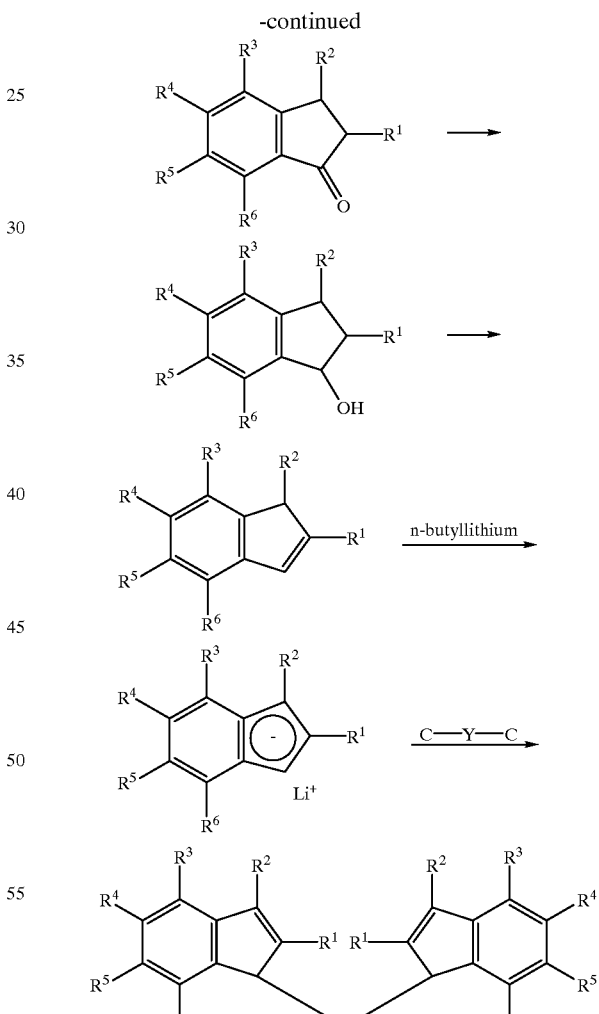

wherein A, B, C are each halogen.

The transition metal compounds used in the invention can be synthesized from these indene derivatives in accordance with conventionally known processes, for example, described in Japanese Patent Laid-Open Publication No. 268307/1992 (corresponding to EP 485822).

In the present invention, a bridge type transition metal compound (metallocene compound) represented by the following formula (C) is also employable.

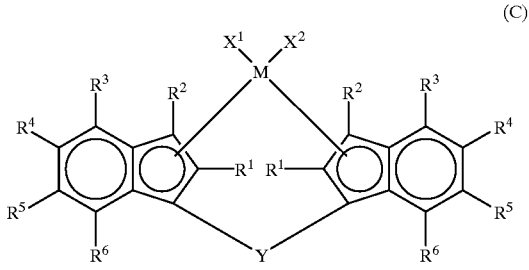

(C)

In the formula (C), M, $R^1$, $R^2$, $R^3$, $R^4$, $R^5$ and $R^6$ are the same as described for those in the aforesaid formula (B).

Of $R^3$, $R^4$, $R^5$ and $R^6$, at least two groups including $R^3$ are preferably alkyl groups, and it is more preferred that $R^3$ and R5, or $R^3$ and $R^6$ are alkyl groups. These alkyl groups are preferably secondary or tertiary alkyl groups, and may be substituted with halogen atoms or silicon-containing groups. As the halogen atoms and the silicon-containing groups, there can be mentioned those substituents as described for $R^1$ and $R^2$.

Of the groups $R^3$, $R^4$, $R^5$ and $R^6$, other groups than the alkyl groups are each preferably hydrogen.

Examples of the hydrocarbon groups of 1 to 20 carbon atoms include chain alkyl groups and cyclic alkyl groups, such as methyl, ethyl, n-propyl, i-propyl, n-butyl, i-butyl, sec-butyl, tert-butyl, pentyl, hexyl, cyclohexyl, heptyl, octyl, nonyl, dodecyl, eicosyl, norbornyl and adamantyl; and arylalkyl groups, such as benzyl, phenylethyl, phenylpropyl and tolylmethyl. These groups may contain a double bond or a triple bond.

Two groups selected from $R^3$, $R^4$, $R^5$ and $R^6$ may be bonded to each other to form a monocyclic or polycyclic ring other than the aromatic ring.

Examples of the halogen atoms are those described for $R^1$ and $R^2$.

$X^1$, $X^2$, Y and $R^7$ are the same as described for those in the aforesaid formula (B).

Listed below are examples of the metallocene compounds (transition metal compounds) represented by the formula (c).

rac-Dimethylsilylene-bis(4,7-dimethyl-1-indenyl) zirconium dichloride, rac-Dimethylsilylene-bis (2,4, 7-trimethyl-1-indenyl) zirconium dichloride, rac-Dimethylsilylene-bis(2,4,6-trimethyl-1-indenyl) zirconium dichloride, rac-Dimethylsilylene-bis(2,5,6-trimethyl-1-indenyl) zirconium dichloride, rac-Dimethylsilylene-bis(2,4,5, 6-tetramethyl-1-indenyl) zirconium dichloride, rac-Dimethylsilylene-bis(2,4,5,6,7-pentamethyl-1-indenyl)zirconium dichloride, rac-Dimethylsilylene-bis(2-methyl-4-n-propyl-7-methyl-1-indenyl)zirconium dichloride, rac-Dimethylsilylene-bis(4-4--propyl-7-methyl-1-indenyl)zirconium dichloride, rac-Dimethylsilylene-bis(2-methyl-4-i-propyl-7-methyl-1-indenyl)zirconium dichloride, rac-Dimethylsilylene-bis(2-methyl-4-i-propyl-6-methyl-1-indenyl)zirconium dichloride, rac-Dimethylsilylene-bis(2-methyl-4-methyl-6-i-propyl-1-indenyl)zirconium dichloride, rac-Dimethylsilylene-bis(2-methyl-4-i-propyl-5-methyl-1-indenyl)zirconium dichloride, rac-Dimethylsilylene-bis(2-methyl-4,6-di(i-propyl)-1-indenyl)zirconium dichloride, rac-Dimethylsilylene-bis(2-methyl-4,6-di(i-propyl)-7-methyl-1-indenyl)zirconium dichloride, rac-Dimethylsilylene-bis(2-methyl-4-i-butyl-7-methyl-1-indenyl)zirconium dichloride, rac-Dimethylsilylene-bis(2-methyl-4-sec-butyl-7-methyl-1-indenyl)zirconium dichloride, rac-Dimethylsilylene-bis(2-methyl-4,6-di(sec-butyl)-1-indenyl)zirconium dichloride, rac-Dimethylsilylene-bis(2-methyl-4-tert-butyl-7-methyl-1-indenyl)zirconium dichloride, rac-Dimethylsilylene-bis(2-methyl-4-cyclohexyl-7-methyl-1-indenyl)zirconium dichloride, rac-Dimethylsilylene-bis(2-methyl-4-benzyl-7-methyl-1-indenyl)zirconium dichloride, rac-Dimethylsilylene-bis(2-methyl-4-phenylethyl-7-methyl-1-indenyl)zirconium dichloride, rac-Dimethylsilylene-bis(2-methyl-4-phenyldichloromethyl-7-methyl-1-indenyl)zirconium dichloride, rac-Dimethylsilylene-bis(2-methyl-4-chloromethyl-7-methyl-1-indenyl)zirconium dichloride, rac-Dimethylsilylene-bis(2-methyl-4-trimethylsilylmethyl-7-methyl-1-indenyl)zirconium dichloride, rac-Dimethylsilylene-bis(2-methyl-4-trimethylsiloxymethyl-7-methyl-1-indenyl)zirconium dichloride, rac-Diethylsilylene-bis(2-methyl-4-i-propyl-7-methyl-1-indenyl)zirconium dichloride, rac-Di(i-propyl)silylene-bis(2-methyl-4-i-propyl-7-methyl-1-indenyl)zirconium dichloride, rac-Di(n-butyl)silylene-bis(2-methyl-4-i-propyl-7-methyl-1-indenyl)zirconium dichloride, rac-Di(cyclohexyl)silylene-bis(2-methyl-4-i-propyl-7-methyl-1-indenyl)zirconium dichloride, rac-Methylphenylsilylene-bis(2-methyl-4-i-propyl-7-methyl-1-indenyl)zirconium dichloride, rac-Diphenylsilylene-bis(2-methyl-4-i-propyl-7-methyl-1-indenyl)zirconium dichloride, rac-Diphenylsilylene-bis(2-methyl-4-di(i-propyl)-1-indenyl)zirconium dichloride, rac-Di(p-tolyl)silylene-bis(2-methyl-4-i-propyl-7-methyl-1-indenyl)zirconium dichloride, rac-Di(p-chlorophenyl)silylene-bis(2-methyl-4-i-propyl-7-methyl-1-indenyl)zirconium dichloride, rac-Dimethylsilylene-bis(2-methyl-4-i-propyl-7-methyl-1-indenyl)zirconium dibromide, rac-Dimethylsilylene-bis(2-methyl-4-i-propyl-7-methyl-1-indenyl)zirconium dimethyl, rac-Dimethylsilylene-bis(2-methyl-4-i-propyl-7-methyl-1-indenyl)zirconium methylchloride, rac-Dimethylsilylene-bis(2-methyl-4-i-propyl-7-methyl-1-indenyl) zirconium-bis(methanesulfonato), rac-Dimethylsilylene-bis(2-methyl-4-i-propyl-7-methyl-1-indenyl) zirconium-bis(p-phenylsulfinato), rac-Dimethylsilylene-bis(2-methyl-3-methyl-4-i-propyl-6-methyl-1-indenyl)zirconium dichloride, rac-Dimethylsilylene-bis(2-ethyl-4-i-propyl-6-methyl-1-indenyl)zirconium dichloride, and
rac-Dimethylsilylene-bis(2-phenyl-4-i-propyl-6-methyl-1-indenyl)zirconium dichloride.

Also employable in the invention are transition metal compounds wherein zirconium is replaced with titanium metal or hafnium metal in the above-mentioned compounds.

The transition metal compounds mentioned above are used generally in the form of racemic modification, but they can be used also in the form of R type or S type.

The indene derivative ligands for the transition metal compounds can be synthesized in accordance with ordinary organic synthesis through, for example, the aforementioned reaction route.

The transition metal compounds (metallocene compounds) represented by the formula (C) can be synthesized from these indene derivatives in accordance with conventionally known processes, for example, described in Japanese Patent Laid-Open Publication No. 268307/1992.

In the present invention, a bridge type transition metal compound (metallocene compound) represented by the following formula (D) is also employable.

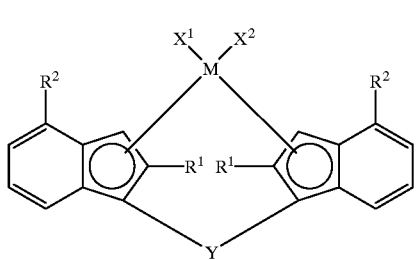

(D)

In the formula (D), M, $R^1$, $X^1$, $X^2$ and Y are the same as described for those in the aforesaid formula (B) or (C).

$R^1$ is preferably a hydrocarbon group, more preferably a hydrocarbon group of 1 to 4 carbon atoms, e.g., methyl, ethyl, propyl and butyl.

$X^1$ and $X^2$ are each preferably a halogen atom or a hydrocarbon group of 1 to 20 carbon atoms.

$R^2$ is an aryl group of 6 to 16 carbon atoms, for example, phenyl, α-naphthyl, β-naphthyl, anthracenyl, phenanthryl, pyrenyl, acenaphthyl, phenalenyl (perinaphthenyl) or aceanthrylenyl. Of these, phenyl or naphthyl is preferred. These aryl groups may be substituted with halogen atoms, hydrocarbon groups of 1 to 20 carbon atoms or halogenated hydrocarbon groups of 1 to 20 carbon atoms such as described for $R^1$.

Listed below are examples of the transition metal compounds (metallocene compounds) represented by the formula (D).

rac-Dimethylsilylene-bis(4-phenyl-1-indenyl)zirconium dichloride,
rac-Dimethylsilylene-bis(2-methyl-4-phenyl-1-indenyl)zirconium dichloride,
rac-Dimethylsilylene-bis(2-methyl-4-(α-naphthyl)-1-indenyl)zirconium dichloride,
rac-Dimethylsilylene-bis(2-methyl-4-(β-naphthyl)-1-indenyl)zirconium dichloride,
rac-Dimethylsilylene-bis(2-methyl-4-(1-anthracenyl)-1-indenyl)zirconium dichloride,
rac-Dimethylsilylene-bis(2-methyl-4-(2-anthracenyl)-1-indenyl)zirconium dichloride,
rac-Dimethylsilylene-bis(2-methyl-4-(9-anthracenyl)-1-indenyl)zirconium dichloride,
rac-Dimethylsilylene-bis(2-methyl-4-(9-phenanthryl)-1-indenyl)zirconium dichloride,
rac-Dimethylsilylene-bis(2-methyl-4-(p-fluorophenyl)-1-indenyl)zirconium dichloride,
rac-Dimethylsilylene-bis(2-methyl-4-(pentafluorophenyl)-1-indenyl)zirconium dichloride,
rac-Dimethylsilylene-bis(2-methyl-4-(p-chlorophenyl)-1-indenyl)zirconium dichloride,
rac-Dimethylsilylene-bis(2-methyl-4-(m-chlorophenyl)-1-indenyl)zirconium dichloride,
rac-Dimethylsilylene-bis(2-methyl-4-(p-chlorophenyl)-1-indenyl)zirconium dichloride,
rac-Dimethylsilylene-bis(2-methyl-4-(o,p-dichlorophenyl)phenyl-1-indenyl)zirconium dichloride,
rac-Dimethylsilylene-bis(2-methyl-4-(p-bromophenyl)-1-indenyl)zirconium dichloride,
rac-Dimethylsilylene-bis(2-methyl-4-(p-tolyl)-1-indenyl)zirconium dichloride,
rac-Dimethylsilylene-bis(2-methyl-4-(m-tolyl)-1-indenyl)zirconium dichloride,
rac-Dimethylsilylene-bis(2-methyl-4-(o-tolyl)-1-indenyl)zirconium dichloride,
rac-Dimethylsilylene-bis(2-methyl-4-(o,o'-dimethylphenyl)-1-indenyl)zirconium dichloride,
rac-Dimethylsilylene-bis(2-methyl-4-(p-ethylphenyl)-1-indenyl)zirconium dichloride,
rac-Dimethylsilylene-bis(2-methyl-4-(p-i-propylphenyl)-1-indenyl)zirconium dichloride,
rac-Dimethylsilylene-bis(2-methyl-4-(p-benzylphenyl)-1-indenyl)zirconium dichloride,
rac-Dimethylsilylene-bis(2-methyl-4-(p-biphenyl)-1-indenyl)zirconium dichloride,
rac-Dimethylsilylene-bis(2-methyl-4-(m-biphenyl)-1-indenyl)zirconium dichloride,
rac-Dimethylsilylene-bis(2-methyl-4-(p-trimethylsilylphenyl)-1-indenyl)zirconium dichloride,
rac-Dimethylsilylene-bis(2-methyl-4-(m-trimethylsilylphenyl)-1-indenyl)zirconium dichloride,
rac-Dimethylsilylene-bis(2-ethyl-4-phenyl-1-indenyl)zirconium dichloride,
rac-Diphenylsilylene-bis(2-ethyl-4-phenyl-1-indenyl)zirconium dichloride,
rac-Dimethylsilylene-bis(2-phenyl-4-phenyl-1-indenyl)zirconium dichloride,
rac-Dimethylsilylene-bis(2-n-propyl-4-phenyl-1-indenyl)zirconium dichloride,
rac-Diethylsilylene-bis(2-methyl-4-phenyl-1-indenyl)zirconium dichloride,
rac-Di-(i-propyl)silylene-bis(2-methyl-4-phenyl-1-indenyl)zirconium dichloride,
rac-Di-(n-butyl)silylene-bis(2-methyl-4-phenyl-1-indenyl)zirconium dichloride,
rac-Dicyclohexylsilylene-bis(2-methyl-4-phenyl-1-indenyl)zirconium dichloride,
rac-Methylphenylsilylene-bis(2-methyl-4-phenyl-1-indenyl)zirconium dichloride,
rac-Diphenylsilylene-bis(2-methyl-4-phenyl-1-indenyl)zirconium dichloride,
rac-Di(p-tolyl)silylene-bis(2-methyl-4-phenyl-1-indenyl)zirconium dichloride,
rac-Di(p-chlorophenyl)silylene-bis(2-methyl-4-phenyl-1-indenyl)zirconium dichloride, rac-Methylene-bis(2-methyl-4-phenyl-1-indenyl)
zirconium dichloride, rac-Ethylene-bis(2-methyl-4-phenyl-1-indenyl)zirconium
dichloride, rac-Dimethylgermylene-bis(2-methyl-4-phenyl-1-indenyl)zirconium dichloride, rac-Dimethylstannylene-bis(2-methyl-4-phenyl-1-indenyl)zirconium dichloride, rac-Dimethylsilylene-bis(2-methyl-4-phenyl-1-indenyl)
zirconium dibromide, rac-Dimethylsilylene-bis(2-methyl-4-phenyl-1-indenyl)
zirconium dimethyl, rac-Dimethylsilylene-bis(2-methyl-4-phenyl-1-indenyl)
zirconium methylchloride, rac-Dimethylsilylene-bis(2-methyl-4-phenyl-1-indenyl)
zirconium chloride $SO_2Me$, and rac-Dimethylsilylene-bis(2-methyl-4-phenyl-1-indenyl)
zirconium chloride $OSO_2Me$.

Also employable in the invention are transition metal compounds wherein zirconium is replaced with titanium metal or hafnium metal in the above-mentioned compounds.

The transition metal compounds represented by the formula (D) can be prepared in accordance with "Journal of Organometallic Chem.", 288(1985), pp. 63–67, and European Patent Publication No. 0,320,762 (specification and examples), for example, in the following manner.

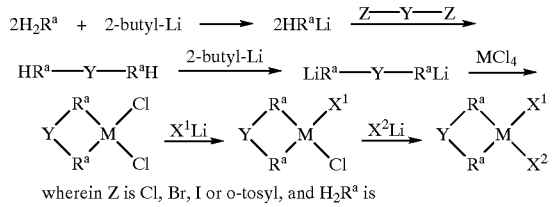

wherein Z is Cl, Br, I or o-tosyl, and $H_2R^a$ is

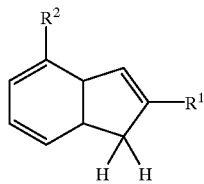

The transition metal compounds (D) are used generally in the form of racemic modification, but they can be used also in the form of R type or S type.

In the present invention, a compound represented by the following formula (3) can be also employed as the metallocene compound (b).

$$L^1M^2Z^1_2 \tag{3}$$

wherein, $M^2$ is a metal of Group 4 or lanthanide series of the periodic table;

$L^1$ is a derivative of delocalization $\pi$ bond group and imparts restraint geometrical shape to the metal $M^2$ active site; and the $Z^1$'s are the same or different, and are each independently hydrogen, halogen, a hydrocarbon group of 20 or less carbon, silicon or germanium atoms, a silyl group or a germyl group.

Of the metallocene compounds (b) of the formula (3), preferred are compounds represented by the following formula (4).

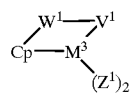

In the formula (4), $M^3$ is titanium, zirconium or hafnium, and $Z^1$ is the same as above.

Cp is a cyclopentadienyl group, a substituted cyclopentadienyl group or a derivative thereof, which is $\pi$-bonded to $M^3$ in the $\eta^5$ bonding way.

$W^1$ is oxygen, sulfur, boron, an element of Group 14 of the periodic table or a group containing any of these elements.

$V^1$ is a ligand containing nitrogen, phosphorus, oxygen or sulfur.

$W^1$ and $V^1$ may form together a fused ring. Further, Cp and $W^1$ may form together a fused ring.

Examples of preferred groups indicated by Cp in the formula (4) include a cyclopentadienyl group, an indenyl group, a fluorenyl group and saturated derivatives of these groups. These groups or derivatives form a ring together with the metal atom ($M^3$).

Each carbon atom in the cyclopentadienyl group may be substituted or unsubstituted with the same or a different group selected from the group consisting of hydrocarbyl groups, substituted-hydrocarbyl groups wherein one or more hydrogen atoms is replaced by a halogen atom, hydrcarbyl-substituted metalloid groups wherein the metalloid is selected from Group 14 of the Periodic Table of the Elements, and halogen groups. In addition, two or more of the substituent groups may form together a fused ring system. The preferred hydrocarbyl and substituted hydrocarbyl groups, which may be substituted for at least one hydrogen atom in the cyclopentadienyl group, will contain from 1 to 20 carbon atoms, and include straight and branched alkyl groups, cyclic hydrocarbon groups, alkyl-substituted cyclic hydrocarbon groups, aromatic groups and alkyl-substituted aromatic groups. Examples of the preferred organometalloid groups include mono-, di- and tri-substituted organometalloid groups of Group 14 elements, and each of the hydrocarbyl groups has 1 to 20 carbon atoms. Particular examples of the preferred organometalloid groups include trimethylsilyl, triethylsilyl, ethyldimethylsilyl, methyldiethylsilyl, phenyldimethylsilyl, methyldiphenylsilyl, triphenylsilyl, triphenylgermyl and trimethylgermyl.

Examples of the groups indicated by $Z^1$ in the formula (4) include hydride, halo, alkyl, silyl, germyl, aryl, amido, aryloxy, alkoxy, phosphido, sulfido, acyl, pseudohalido (e.g., cyanide, azido), acetylacetonato and mixtures thereof. The groups indicated by $Z^1$ may be the same as or different from each other.

As the metallocene compound (b), the metallocene compound represented by the formula (3) is particularly preferable from the viewpoints of polymerization activity and transparency, rigidity, heat resistance and impact resistance of the resulting molded product. The metallocene compounds (b) mentioned above may be used singly or in combination of two or more kinds.

The metallocene compound (b) for use in the invention may be diluted with a hydrocarbon or a halogenated hydrocarbon prior to use.

Next, the organoaluminum oxy-compound (c) and the ionizing ionic compound (d) used for forming the metallocene compound (a) are described.

The organoaluminum oxy-compound (c) for use in the invention may be aluminoxane conventionally known or a benzene-insoluble organoaluminum oxy-compound exemplified in Japanese Patent Laid-Open Publication No. 78687/1990 (corresponding to USP 4990640, EP 360492B).

The aluminoxane is prepared by, for example, the following processes, and is generally recovered as a hydrocarbon solvent solution.

(1) An organoaluminum compound such as trialkylaluminum is added to an aromatic hydrocarbon solvent suspension of a compound containing adsorbed water or a salt containing water of crystallization, e.g., magnesium chloride hydrate, copper sulfate hydrate, aluminum sulfate hydrate, nickel sulfate hydrate or cerous chloride hydrate, to thereby allow the organoaluminum compound to react with the adsorbed water or the water of crystallization, followed by recovering aluminoxane as its aromatic hydrocarbon solvent solution.

(2) Water, ice or water vapor is allowed to directly act on an organoaluminum compound such as trialkylaluminum in a medium such as benzene, toluene, ethyl ether or tetrahydrofuran, followed by recovering aluminoxane as its aromatic hydrocarbon solvent solution.

(3) An organotin oxide such as dimethyltin oxide or dibutyltin oxide is allowed to react with an organoaluminum compound such as trialkylaluminum in a hydrocarbon medium such as decane, benzene or toluene.

Examples of the ionizing ionic compounds (d) includes Lewis acid, ionic compounds, borane compounds and carborane compounds. These ionizing ionic compounds are described in National Publications of international Patent No. 501950/1989 and No. 502036/1989, Japanese Patent Laid-Open Publications No. 179005/1991, No. 179006/1991, No. 207703/1991 and No. 207704/1991, and U.S. Pat. No. 5,321,106.

The Lewis acid which may be used as the ionizing ionic compound (d) is, for example, a compound represented by the formula $BR_3$ (each R is the same or different and is a phenyl group which may have a substituent such as fluorine, methyl or trifluoromethyl, or a fluorine atom). Examples of such compounds include trifluoroboron, triphenylboron, tris(4-fluorophenyl)boron, tris(3,5-difluorophenyl)boron, tris(4-fluoromethylphenyl)boron and tris(pentafluorophenyl)boron.

The ionic compound which may be used as the ionizing ionic compound (d) is a salt comprising a cationic compound and an anionic compound. The anionic compound reacts with the metallocene compound (b) to render the compound (b) cationic and to form an ion pair, whereby the transition metal cation seed is stabilized. Examples of such anions include organoboron compound anion, organoarsenic compound anion and organoaluminum compound anion. Preferable are anions which are relatively bulky and stabilize the transition metal cation seed. Examples of the cations include metallic cation, organometallic cation, carbonium cation, tripium cation, oxonium cation, sulfonium cation, phosphonium cation and ammonium cation. More specifically, there can be mentioned triphenylcarbenium cation, tributylammonium cation, N,N-dimethylammonium cation, ferrocenium cation, etc.

Of these, preferable are the ionic compounds containing a boron compound as the anionic compound, and examples thereof include trialkyl-substituted ammonium salts, N,N,-dialkylanilinium salts, dialkylammonium salts and triarylphosphonium salts.

Examples of the trialkyl-substituted ammonium salts include triethylammoniumtetra(phenyl)boron, tripropylammoniumtetra(phenyl)boron, tri(n-butyl)ammoniumtetra(phenyl)boron and trimethylammoniumtetra(p-tolyl)boron.

Examples of the N,N,-dialkylanilinium salts include N,N-dimethylaniliniumtetra(phenyl)boron.

Examples of the dialkylammonium salts include di(n-propyl)ammoniumtetra(pentafluorophenyl)boron and dicyclohexylammoniumtetra(phenyl)boron.

Examples of the triarylphosphonium salts include triphenylphosphoniumtetra(phenyl)boron, tri(methylphenyl)phosphoniumtetra(phenyl)boron and tri(dimethylphenyl)phosphoniumtetra(phenyl)boron.

Also available as the ionic compounds are triphenylcarbeniumtetrakis(pentafluorophenyl)borate, N,N-dimethylaniliniumtetrakis(pentafluorophenyl)borate and ferroceniumtetrakis(pentafluorophenyl)borate.

Examples of borane compounds which may be used as the ionizing ionic compound (d) include decaborane(14);

salts of anions, such as bis[tri(n-butyl)ammonium]nonaborate and bis[tri(n-butyl)ammonium]decaborate; and salts of metallic borane anions, such as tri(n-butyl)ammoniumbis(dodecahydridododecaborate)cobaltate (III) and bis[tri(n-butyl)ammonium]bis(dodecahydridododecaborate)-nickelate(III).

Examples of the carborane compounds which may be used as the ionizing ionic compound (d) include salts of anions, such as 4-carbanonaborane(14) and 1,3-dicarbanonaborane(13); and salts of metallic carborane anions, such as tri(n-butyl)ammoniumbis(nonahydrido-1,3-dicarbanonaborate)cobaltate(III) and tri(n-butyl)ammoniumbis(undecahydrido- 7,8-dicarbaundecaborate)ferrate(III).

The ionizing ionic compounds (d) mentioned above can be used singly or in combination of two or more kinds.

The metallocene compound (a) used in the invention may optionally contain the following organoaluminum compound (e), in addition to the above components.

The organoaluminum compound (e) which is optionally used is, for example, an organoaluminum compound represented by the following formula (5):

$$(R^6)_n AlX_{3-n} \qquad (5)$$

wherein $R^6$ is a hydrocarbon group of 1 to 15 carbon atoms (preferably 1 to 4 carbon atoms), X is a halogen atom or hydrogen, and n is 1 to 3.

The hydrocarbon group of 1 to 15 carbon atoms is, for example, an alkyl group, a cycloalkyl group or an aryl group. Examples of such groups include methyl, ethyl, n-propyl, isopropyl and isobutyl.

Examples of the organoaluminum compounds include:

trialkylaluminums, such as trimethylaluminum, triethylaluminum, triisopropylaluminum, tri-n-butylaluminum, triisobutylaluminum and tri-sec-butylaluminum;

alkenylaluminums represented by the formula $(i\text{-}C_4H_9)_x Al_y(C_5H_{10})z$ (wherein x, y and z are each a positive number, and $z \geq 2x$), such as isoprenylaluminumi;

dialkylaluminum halides, such as dimethylaluminum chloride and diisobutylaluminum chloride;

dialkylaluminum hydrides, such as diisobutylaluminum hydride;

dialkylaluminum alkoxides, such as dimethylaluminum methoxide; and dialkylaluminum aryloxides, such as diethylaluminum phenoxide.

Copolymerization of ethylene, the aromatic vinyl compound, and if desired, the α-olefin of 3 to 20 carbon atoms may be carried out batchwise or continuously. When the copolymerization is carried out continuously, the metallocene catalyst (a) is used in the following concentration.

The concentration of the metallocene compound (b) in the polymerization system is in the range of usually 0.00005 to 1.0 mmol/liter (polymerization volume), preferably 0.0001 to 0.5 mmol/liter.

The organoaluminum oxy-compound (c) is used in such an amount that the ratio of the aluminum atom in the organoaluminum oxy-compound to the transition metal in the metallocene compound (b) in the polymerization system, Al/transition metal, is in the range of 0.1 to 10,000 to 1 to 5,000.

The ionizing ionic compound (d) is used in such an amount that the molar ratio of the ioniziong ionic compound (d) to the metallocene compound (b) in the polymerization system (ionizing ionic compound (d)/metallocene compound (b)) is in the range of 1.0 to 20, preferably 1 to 10.

The organoaluminum compound (e) is used in such an amount that the concentration of the organoaluminum compound (e) is in the range of usually 0 to 5 mmol/liter (polymerization volume), preferably 0 to 2 mmol/liter.

The copolymerization reaction to prepare the α-olefin/ aromatic vinyl compound random copolymer is carried out under the conditions of a temperature of usually −30 to +250° C., preferably 0 to 200° C., and a pressure of usually more than 0 and not more than 80 kg/cm$^2$ (gauge pressure), preferably more than 0 and not more than 50 kg/cm$^2$ (gauge pressure).

The reaction time (average residence time in case of continuous copolymerization) is in the range of usually 5 minutes to 3 hours, preferably 10 minutes to 1.5 hours, though it varies depending on the reaction conditions such as catalyst concentration and polymerization temperature.

In the preparation of the α-olefin/aromatic vinyl compound random copolymer, ethylene, the aromatic vinyl compound and optionally the α-olefin of 3 to 20 carbon atoms are fed to the polymerization system in such amounts that the copolymer of aforesaid specific composition can be obtained. In the copolymerization, a molecular weight modifier such as hydrogen can be used.

When ethylene, the aromatic vinyl compound and optionally the α-olefin of 3 to 20 carbon atoms are copolymerized as described above, the α-olefin/aromatic vinyl compound random copolymer is generally obtained as a polymerization solution containing it. The polymerization solution is treated in a conventional manner, whereby the α-olefin/aromatic vinyl compound random copolymer is obtained.

In the present invention, the monomer grafted on the α-olefin/aromatic vinyl compound random copolymer (referred to as "graft monomer" hereinafter) is an unsaturated carboxylic acid or its derivative. Examples of the unsaturated carboxylic acids include acrylic acid, methacrylic acid, maleic acid, fumaric acid and itaconic acid. Examples of the derivatives of unsaturated carboxylic acids include anhydrides, esters, amides, imides and metallic salts of unsaturated carboxylic acids. Particular examples thereof include maleic anhydride, citraconic anhydride, itaconic anhydride, methyl acrylate, methyl methacrylate, ethyl acrylate, ethyl methacrylate, butyl acrylate, butyl methacrylate, glycidyl acrylate, glycidyl methacrylate, monomethyl maleate, diethyl maleate, monomethyl fumarate, dimethyl fumarate, monomethyl itaconate, diethyl itaconate, acrylamide, methacrylamide, maleic acid monoamide, maleic acid diamide, maleic acid N-monoethylamide, maleic acid N,N-diethylamide, maleic acid N-monobutylamide, maleic acid N,N-dibutylamide, fumaric acid monoamide, fumaric acid diamide, fumaric acid N-monoethylamide, fumaric acid N,N-diethylamide, fumaric acid N-monobutylamide, fumaric acid N,N-dibutylamide, maleimide, N-butyl maleimide, N-phenyl maleimide, sodium acrylate, sodium methacrylate, potassium acrylate and potassium methacrylate. Of the graft monomers, maleic anhydride is preferably employed.

For the graft copolymerization of the α-olefin/aromatic vinyl compound random copolymer with the graft monomer to prepare a modified copolymer, various known methods are available. For example, the α-olefin/aromatic vinyl compound random copolymer and the graft monomer are heated at a high temperature together with or without a radical initiator in the presence or absence of a solvent to perform graft copolymerization. In the graft copolymerization reaction, other vinyl monomers such as styrene may be allowed to be present in the system.

In order to prepare a partially or wholly graft modified α-olefin/aromatic vinyl compound random copolymer having a graft quantity (graft ratio) of 0.01 to 30% by weight, a process comprising the steps of initially preparing a graft-modified α-olefin/aromatic vinyl compound random copolymer having a high graft ratio and then adding an unmodified α-olefin/aromatic vinyl compound random copolymer to the graft-modified α-olefin/aromatic vinyl compound random copolymer to adjust the graft ratio is preferably used from the viewpoint of industrial production. The graft quantity used herein means the proportion of the graft copolymerized monomer to 100 g of the graft modified copolymer. For example, in case that 1 g of the graft copolymerized monomer is present in 100 g of the graft modified copolymer, the graft quantity is defined as 1% by weight. According to this process, the concentration of the graft monomer in the composition can be properly adjusted. The copolymer obtained by this process is referred to as "partially graft-modified α-olefin/aromatic vinyl compound random copolymer". As a matter of course, a given amount of the graft monomer may be added to the α-olefin/aromatic vinyl compound random copolymer from the first to perform graft copolymerization. The copolymer obtained by this process is referred to as "wholly graft-modified α-olefin/ aromatic vinyl compound random copolymer".

The adhesive resin composition of the invention may further contain an ethylene/α-olefin copolymer and/or an ethylene/vinyl acetate copolymer, in addition to the above-mentioned modified copolymer.

By the addition of the ethylene/α-olefin copolymer to the modified copolymer, the melt viscosity of the resulting adhesive composition of the invention can be decreased to improve the moldability, and the adhesion properties after retorting treatment can be further improved. Besides, the adhesion properties of the composition to polyolefins can be also improved.

By the addition of the ethylene/vinyl acetate copolymer to the modified copolymer or to the modified copolymer and the ethylene/α-olefin copolymer, the melt viscosity of the resulting adhesive composition of the invention can be decreased to improve the moldability, and the adhesion properties after retorting treatment can be further improved.

In further aspect of the invention, the graft monomer is desirably grafted on the α-olefin/aromatic vinyl compound random copolymer in such an amount that the graft quantity (weight ratio) of the graft monomer to the whole adhesive resin composition is in the range of 0.01 to 30% by weight, particularly 0.05 to 10% by weight. The graft quantity used herein means the weight proportion of the graft monomer to 100 g of the whole adhesive resin composition.

Ethylene/α-Olefin Copolymer

The ethylene/α-olefin copolymer for use in the invention is an ethylene/α-olefin copolymer obtained by random copolymerizing ethylene and an α-olefin and having an ethylene content of 45 to 95% by mol, preferably 45 to 90% by mol.

The ethylene/α-olefin copolymer has a melt flow rate (ASTM D 1238, conditions: E) of usually 0.1 to 50 g/10 min, preferably 0.3 to 30 g/10 min, a density of usually 0.850 to 0.900 g/cm$^3$, preferably 0.850 to 0.890 g/cm$^3$, and a crystallinity (measured by X-ray diffractometry) of usually less than 30%, preferably less than 25%.

The α-olefin used for forming the ethylene/α-olefin copolymer is an α-olefin of 3 to 20 carbon atoms, and examples thereof include propylene, 1-butene, 1-hexene, 4-methyl-1-pentene, 1-octene, 1-decene, 1-tetradecene and 1- octadecene. These α-olefins are used singly or in combination of two or more kinds.

The ethylene/α-olefin copolymer has a melting point (ASTM D 3418) of usually not higher than 100° C.

Ethylene/Vinyl Acetate Copolymer

The ethylene/vinyl acetate copolymer for use in the invention desirably has a vinyl acetate content of 5 to 40% by weight, preferably 10 to 35% by weight. Further, the ethylene/vinyl acetate copolymer has a melt flow rate (ASTM D 1238, conditions: E) of usually 0.1 to 50 g/10 min, preferably 0.3 to 30 g/10 min.

The adhesive resin composition of the invention may furthermore contain an ethylene polymer, a propylene polymer, modified products of these polymers, a tackifier, etc., in addition to the graft-modified α-olefin/aromatic vinyl compound random copolymer, the ethylene/α-olefin copolymer and the ethylene/vinyl acetate copolymer.

Ethylene Polymer

The ethylene polymer for use in the invention is a homopolymer of ethylene or a copolymer of ethylene and a small amount of an α-olefin, and has an ethylene content of more than 90% by mol and not more than 100% by mol, preferably 95 to 100% by mol.

The ethylene polymer has a melt flow rate (ASTM D 1238, conditions: E) of usually 0.1 to 50 g/10 min, preferably 0.3 to 30 g/10 min, and a density of usually 0.900 to 0.980 g/cm$^3$, preferably 0.920 to 0.970 g/cm$^3$.

The α-olefin used for forming the ethylene polymer is an α-olefin of 3 to 20 carbon atoms, and examples thereof include propylene, 1-butene, 1-hexene, 4-methyl-1-pentene, 1-octene, 1-decene, 1-tetradecene and 1-octadecene. These α-olefins can be used singly or in combination of two or more kinds.

The ethylene polymer may be modified with an unsaturated carboxylic acid or its derivative. Examples of the unsaturated carboxylic acids and their derivatives are the same as described above. For preparing the modified ethylene polymer, various known methods are available.

When the ethylene polymer is added to the adhesive resin composition, the adhesive strength of the composition can be improved.

Propylene Polymer

The propylene polymer for use in the invention is a homopolymer of propylene or a copolymer of propylene and an α-olefin, and has a propylene content of more than 55% by mol and not more than 100% by mol, preferably 80 to 100% by mol.

The propylene polymer has a melt flow rate (ASTM D 1238, conditions: E) of usually 0.1 to 50 g/10 min, preferably 0.3 to 30 g/10 min, and a melting point (Tm) of 110 to 165° C., preferably 120 to 165° C.

The α-olefin used for forming the propylene polymer is ethylene and an α-olefin of 4 to 20 carbon atoms, and examples thereof include 1-butene, 1-hexene, 4-methyl-1-pentene, 1-octene, 1-decene, 1-tetradecene and 1-octadecene. These α-olefins can be used singly or in combination of two or more kinds.

The propylene polymer may be modified with an unsaturated carboxylic acid or its derivative. Examples of the unsaturated carboxylic acids and their derivatives are the same as described above. For preparing the modified propylene polymer, various known methods are available.

When the propylene polymer is added to the adhesive resin composition, the adhesive strength of the composition can be improved.

Tackifier

The tackifier is added to the adhesive resin composition to adjust melt viscosity of the composition or to improve hot tack properties and wetting properties. Examples of the tackifiers favorably used include alicyclic hydrogenated tackifiers, rosins, modified rosins, esters of these rosins, aliphatic petroleum resins, alicyclic petroleum resins, aromatic petroleum resins, copolymer petroleum resins of aliphatic component and aromatic component, low-molecular weight styrene resins, isoprene resins, alkylphenol resin, terpene resin and coumarone-indene resin. These tackifiers can be used singly or in combination of two or more kinds.

Blending Ratio

The adhesive resin composition of the invention contains the graft-modified α-olefin/aromatic vinyl compound random copolymer as its major component, and comprises the graft-modified α-olefin/aromatic vinyl compound random copolymer in an amount of 1 to 100 parts by weight, preferably 1 to 80 parts by weight, more preferably 10 to 80 parts by weight, and a soft polymer in an amount of 0 to 99 parts by weight, preferably 20 to 99 parts by weight, more preferably 20 to 90 parts by weight, with the proviso that the total amount of the modified copolymer and the soft polymer is 100 parts by weight.

The soft polymer is, for example, the ethylene/α-olefin copolymer, the ethylene/vinyl acetate copolymer or a mixture thereof.

A preferred embodiment of the adhesive resin composition of the invention is a composition comprising the modified copolymer in an amount of 10 to 80 parts by weight and the ethylene/α-olefin copolymer and/or the ethylene/vinyl acetate copolymer in an amount of 20 to 90 parts by weight, with the proviso that the total amount of the copolymers is 100 parts by weight.

Specific examples of such compositions include:

a composition comprising the modified copolymer in an amount of 10 to 80 parts by weight, preferably 30 to 80 parts by weight, and the ethylene/α-olefin copolymer in an amount of 20 to 90 parts by weight, preferably 20 to 70 parts by weight, with the proviso that the total amount of the copolymers is 100 parts by weight;

a composition comprising the modified copolymer in an amount of 10 to 80 parts by weight, preferably 30 to 80 parts by weight, and the ethylene/vinyl acetate copolymer in an amount of 20 to 90 parts by weight, preferably 20 to 70 parts by weight, with the proviso that the total amount of the copolymers is 100 parts by weight; and a composition comprising the modified copolymer in an amount of 10 to 80 parts by weight, preferably 30 to 80 parts by weight, the ethylene/α-olefin copolymer in an amount of 5 to 60 parts by weight, preferably 10 to 50 parts by weight, and the ethylene/vinyl acetate copolymer in an amount of 5 to 40 parts by weight, preferably 10 to 30 parts by weight, with the proviso that the total amount of the copolymers is 100 parts by weight.

To the adhesive resin composition of the invention, the ethylene polymer, the propylene polymer, modified products of these polymers, the tackifier, etc. may be added, in addition to the modified copolymer, the ethylene/α-olefin copolymer and the ethylene/vinyl acetate copolymer.

When the ethylene polymer or its modified product is used, the amount of the ethylene polymer or its modified product is in the range of 0.1 to 50 parts by weight, preferably 1 to 30 parts by weight, based on 100 parts by weight of the total amount of the modified copolymer, the ethylene/α-olefin copolymer and the ethylene/vinyl acetate copolymer.

When the propylene polymer or its modified product is used, the amount of the propylene polymer or its modified product is in the range of 0.1 to 50 parts by weight, preferably 1 to 30 parts by weight, based on 100 parts by weight of the total amount of the modified copolymer, the ethylene/α-olefin copolymer and the ethylene/vinyl acetate copolymer.

When the tackifier is used, the amount thereof is in the range of 0.5 to 25 parts by weight, preferably 5 to 15 parts by weight, based on 100 parts by weight of the total amount of the modified copolymer, the ethylene/α-olefin copolymer and the ethylene/vinyl acetate copolymer.

As described above, the adhesive resin composition of the invention contains the graft-modified α-olefin/aromatic vinyl compound random copolymer as its essential component, and the whole adhesive resin composition has a graft quantity (ratio) of usually 0.01 to 30% by weight, preferably 0.05 to 10% by weight, MFR of 0.1 to 50 g/10 min, preferably 0.2 to 40 g/10 min, and a crystallinity of less than 35%.

The adhesive resin composition of the invention comprises the graft-modified α-olefin/aromatic vinyl compound random copolymer, or further contains the ethylene/α-olefin copolymer and/or the ethylene/vinyl acetate copolymer. The composition can be prepared by various known processes, for example, a process comprising mixing the components by a Henschel mixer, a V-type blender, a ribbon blender, a tumbling blender or the like, and a process comprising mixing the components by the above mixing device, then melt-kneading the mixture by a single-screw extruder, a twin-screw extruder, a kneader, a Banbury mixer or the like, and granulating or pulverizing the kneadate.

To the adhesive resin composition of the invention, other various additives, such as heat stabilizer, weathering stabilizer, antistatic agent, pigment, dye and anticorrosion agent, can be added in addition to the above components, within limits not prejudicial to the object of the present invention.

The adhesive resin composition of the invention has excellent adhesive strength to polyester resins, polycarbonate resins, saponified olefin/vinyl acetate copolymers and polyolefins. Therefore, the composition can be favorably used as an adhesive between these resins. If the adhesive resin composition is used to combine a polycarbonate layer or a polyester layer with a saponified ethylene/vinyl acetate copolymer layer, the resulting laminate has excellent gas permeation resistance and is free from separation of layers even when subjected to hot filling treatment or retorting treatment.

Next, the laminate according to the invention is described.

The laminate of the invention comprises (I) a polyester resin layer or a polycarbonate resin layer, (II) an adhesive layer formed from the above-described adhesive resin composition and (III) a saponified olefin/vinyl acetate copolymer layer.

The layer (I) of the laminate according to the invention is a layer formed from a resin selected from a polyester resin and a polycarbonate resin.

The polyester resin is a polyester consisting of dihydroxy compound units derived from a dihydroxy compound and dicarboxylic acid units derived from a dicarboxylic acid. The dihydroxy compound is selected from aliphatic glycols, such as ethylene glycol, propylene glycol, 1,4-butanediol, neopentyl glycol and hexamethylene glycol; alicyclic glycols, such as cyclohexanedimethanol; aromatic dihydroxy compounds, such as bisphenol; and mixtures thereof. The dicarboxylic acid is selected from aromatic dicarboxylic acids, such as terephthalic acid, isophthalic acid and 2,6-naphthalenedicarboxylic acid; aliphatic dicarboxylic acids, such as oxalic acid, succinic acid, adipic acid, sebacic acid and undecadicarboxylic acid; alicyclic dicarboxylic acids, such as hexahydroterephthalic acid; and mixtures thereof. The polyester resin may be modified with a small amount of a tri- or higher-valent polyhydroxy compound or polycarboxylic acid, such as triol or tricarboxylic acid, as far as the modified product exhibits thermoplasticity. Examples of the thermoplastic polyester resins include polyethylene terephthalate, polybutylene terephthalate and a polyethylene isophthalate/terephthalate copolymer.

The polycarbonate resin includes various polycarbonates and copolycarbonates obtained by causing a dihydroxy compound to react with phosgene or diphenyl carbonate in a conventional manner. Examples of the dihydroxy compounds include hydroquindihydroxyrcinol, 4,4'-dihydroxydiphenylmethane, 4,4'-dihydroxydiphenylethane, 4,4'-dihydroxydiphenyl-n-butane, 4,4'-dihydroxydiphenylheptane, 4,4'-dihydroxydiphenylphenylmethane, 4,4'-dihydroxydiphenyl-2,2-propane (bisphenol A), 4,4'-dihydroxy-3,3'-dimethyldiphenyl-2,2-propane, 4,4'-dihydroxy-3,3'-diphenyldiphenyl-2,2-propane, 4,4'-dihydroxydichlorodiphenyl-2,2-propane, 4,4'-dihydroxydiphenyl-1,1-cyclopentane, 4,4'-dihydroxydiphenyl-1,1-cyclohexane, 4,4'-dihydroxydiphenylmethylphenylmethane, 4,4'-dihydroxydiphenylethylphenymethane, 4,4'-dihydroxydiphenyl-2,2,2-trichloro-1,1-ethane, 2,2'-dihydroxydiphenyl, 2,6-dihydroxynaphthalene, 4,4'-dihydroxydiphenyl ether, 4,4'-dihydroxy-3,3'-dichlorodiphenyl ether and 4,4'-dihydroxy-2,5-diethoxyphenyl ether. Of these, 4,4'-dihydroxydiphenyl-2,2-propane (bisphenol A) is preferred because polycarbonate obtained by the use thereof has excellent mechanical performance and transparency.

For forming the adhesive layer (II) of the laminate according to the invention, the aforementioned adhesive resin composition of the invention is employed.

The layer (III) of the laminate according to the invention is a layer formed from a saponified olefin/vinyl acetate copolymer. The saponified olefin/vinyl acetate copolymer used herein is a saponified copolymer which is obtained by saponifying an olefin/vinyl acetate copolymer having an olefin content of 15 to 60% by mol, preferably 25 to 50% by mol, and has a saponification degree of not less than 50%, preferably not less than 90%. When the olefin content is in the above range, the saponified copolymer is almost free from thermal decomposition, shows easy melt-molding and has excellent stretchability, water resistance and gas permeation resistance. When the saponification degree is not less than 50%, the copolymer has excellent gas permeation resistance.

Examples of olefins to be copolymerized with vinyl acetate include ethylene, propylene, 1-butene, 1-hexene, 4-methyl-1-pentene, 1-octene, 1-decene, 1-tetradecene and 1-octadecene. Of these, ethylene is preferred from the viewpoints of mechanical strength and moldability.

The laminate of the invention can be prepared by a method comprising melting the polyester resin or the polycarbonate resin, the adhesive resin composition and the saponified olefin/vinyl acetate copolymer by separate extruders, feeding them to a die of three-layer structure and co-extruding them in such a manner that the layer of the adhesive resin composition becomes an intermediate layer (co-extrusion method), or a method comprising beforehand forming a layer of the polyester resin or the polycarbonate resin and a layer of the saponified olefin/vinyl acetate copolymer and then melt-extruding the adhesive resin composition between those layers (sandwich laminating method). Of these, the co-extrusion method is preferred from the viewpoint of interlaminar strength. The co-extrusion method includes a T-die method using a flat die and an inflation method using a circular die. As the flat die, any of a single-manifold type and a multi-manifold type each using black box is available. For the inflation method, any of known dyes is available.

The thickness of each layer of the laminate is appropriately determined according to the use application. When the laminate is used as a sheet or a film, it is preferable that the polyester resin layer (I) or the polycarbonate resin layer (I) has a thickness of about 0.02 to 5 mm, the adhesive layer (II) has a thickness of about 0.01 to 1 mm, the saponified ethylene/vinyl acetate copolymer layer (III) has a thickness of about 0.01 to 1 mm.

The laminate of the invention may be a laminate having such a structure that the layer (I) is provided on each side, e.g., a structure of (I)/(II)/(III)/(II)/(I), or a laminate having such a structure that a polyolefin layer is further provided, e.g., a structure of polypropylene layer/(II)/(III)/(II)/(I) or a structure of polyethylene layer/ (II) (III) (II) (I).

EFFECT OF THE INVENTION

The adhesive resin composition of the invention has excellent adhesion properties and heat resistance. Therefore, when the composition is used as an adhesive to combine the polyester resin layer (I) or the polycarbonate resin layer (I) with the saponified olefin/vinyl acetate copolymer layer (III), the layer (I) and the layer (III) can be firmly adhered, and separation between the layer (I) and the layer (III) can be inhibited even under high-temperature conditions such as those in hot filling treatment or retorting treatment. Further, adhesive strength satisfactory in the practical use can be maintained even at ordinary temperature after the high-temperature treatment.

The laminate of the invention consisting of the layer (I), the layer (II) and the layer (III) is very advantageous as a retort packaging material or a hot fill packaging material because of low permeability to gases such as oxygen.

EXAMPLE

The present invention is further described with reference to the following examples, but it should be construed that the invention is in no way limited to those examples.

In the following examples, crystallinity and density were measured by the below-described methods.
Preparation of Sample The composition was heated at 180° C. for 10 minutes by means of a hot press and then rapidly cooled by means of a cooling press (water cooling) to prepare a sample.
Crystallinity The crystallinity of the sample prepared above was measured by X-ray diffractometry.
Density The density of the sample prepared above was determined at 23° C. by gradient tube density determination.
Preparation 1

Preparation of Ethylene/Styrene Random Copolymer

A 1-liter glass reactor equipped with a cooling tube and a stirrer was thoroughly purged with nitrogen and then charged with 645 ml of toluene and 35 ml of styrene. Then, ethylene was added with stirring to give a saturated solution. Thereafter, the system was heated to 35° C., and 4.5 mmol of methylaluminoxane (10 wt % toluene solution, available from Tosoh Aquzo K. K.) and 0.045 mmol of (t-butylamide) dimethyl(tetramethyl-$\eta^5$-cyclopentadienyl)silane titanium dichloride (0.01 mmol toluene solution) were added. Then, ethylene was continuously fed at a feed rate of 100 N-liter/hr to perform polymerization at 40° C. for 60 minutes. After the polymerization was completed, 250 ml of isobutyl alcohol and 10 ml of hydrochloric acid were added, and the mixture was stirred at 80° C. for 30 minutes. The reaction solution containing isobutyl alcohol was transferred into a separatory funnel, washed twice with 250 ml of water, and separated into oil phase and water phase. Then, the oil phase was added to 3 liters of methanol to precipitate a polymer. The polymer precipitated was vacuum dried at 130° C. for 12 hours to obtain an ethylene/styrene random copolymer (referred to as "ESC1" hereinafter). In the obtained ESC1, the molar ratio of ethylene to styrene was 90/10 (ethylene/styrene). The ESC1 had an intrinsic viscosity [η], as measured in decalin at 135° C., of 2.1 dl/g.

Graft modification of ESC1

A 1-liter glass autoclave was thoroughly purged with nitrogen and then charged with 190 ml of toluene and 30 g of the ESC1. The mixture was heated to 140° C. with stirring. In a different container, 5.3 g of maleic anhydride and 6.9 g of dicumyl peroxide were dissolved in 40 ml of toluene to prepare a solution. The solution was dropwise added to the autoclave at the uniform rate over a period of 3.5 hours, and the mixture in the autoclave was stirred for 30 minutes. During the dropwise addition, the temperature of the system was slowly raised up to 160° C. After the reaction was completed, the system was cooled to 70° C. Then, the reaction solution was added to 1 liter of methanol to precipitate a polymer. The polymer precipitated was washed with 1 liter of acetone and vacuum dried at 130° C. for 12 hours, to obtain a graft-modified product of ESC1 (referred to as "MAH-ESC1" hereinafter). In. the obtained MAH-ESC1, the graft quantity (graft ratio) of maleic anhydride was 2.2% by weight. The MAH-ESC1 had an intrinsic viscosity [η], as measured in decalin at 135° C., of 2.0 dl/g.

Preparation 2

Preparation of Ethylene/styrene Random Copolymer

An ethylene/styrene random copolymer (referred to as "ESC2" hereinafter) was obtained in the same manner as in Preparation 1, except that (t-butylamide)dimethyl (tetramethyl-$\eta^5$-cyclopentadienyl)silane titanium dichloride was replaced with isopropylidene-bis(indenyl)zirconium dichloride. In the obtained ESC2, the molar ratio of ethylene to styrene was 88/12 (ethylene/styrene). The ESC2 had an intrinsic viscosity [η], as measured in decalin at 135° C., of 1.8 dl/g.

Graft Modification of ESC2

Graft modification was carried out in the same manner as in Preparation 1, except that the copolymer (ESC2) prepared above was used in place of the ESC1, to obtain a graft-modified product of ESC2 (referred to as "MAH-ESC2" hereinafter). In the obtained MAH-ESC2, the graft quantity (graft ratio) of maleic anhydride was 2.0% by weight. The MAH-ESC2 had an intrinsic viscosity [η], as measured in decalin at 135° C., of 1.8 dl/g.

Example 1

The MAH-ESC1 prepared in Preparation 1, polycarbonate (trade name: Teijin Panlite L-1250, available from Teijin Kasei K. K., referred to as "PC" hereinafter), a saponified ethylene/vinyl acetate copolymer (MFR: 1.3 g/10 min, density: 1.19 g/cm$^3$, ethylene content: 32% by mol, trade name: Kuraray Eval EP-F, available from Kuraray Co., Ltd., referred to as "EVOH" hereinafter) and polyethylene (trade name: Ultozex 2021L, Mitsui Chemicals, Inc., referred to as "PE" hereinafter) were used to prepare a five-layer sheet under the following conditions.

Structure of sheet: PC/MAH-ESC1/EVOH/MAH-ESC1/PE Thickness of each layer (μm): 80/50/50/50/80

Extruder:

Extruder having a diameter of 40 mm, 280° C. (for PC)

Extruder having a diameter of 30 mm, 250° C. (for MAH-ESC1)

Extruder having a diameter of 30 mm, 210° C. (for EVOH)

Extruder having a diameter of 40 mm, 230° C. (for PE)

The five-layer sheet obtained above was subjected to T-peel test to measure interlaminar strength (FPC, g/15 mm) between the PC layer and the MAH-ESC1 layer and interlaminar strength (FEVOH, g/15 mm) between the EVOH layer and the MAH-ESC1 layer under the conditions of a temperature of 23° C. or 80° C. and a peel rate of 300 mm/min. Further, the sheet was subjected to retorting treatment at 131° C. for 30 minutes. Then, T-peel test was carried out under the same conditions as above. The results are set forth in Table 1.

Next, the MAH-ESC1, EVOH, polyethylene terephthalate (obtained by adding a crystallization accelerator to J35 of Mitsui Pet K. K., referred to as "PET" hereinafter) and PE were used to prepare a five-layer sheet under the following conditions.

Structure of sheet: PET/MAH-ESC1/EVOH/MAH-ESC1/PE

Thickness of each layer (μm): 80/50/50/50/80

Extruder:

Extruder having a diameter of 40 mm, 280° C. (for PET)

Extruder having a diameter of 30 mm, 250° C. (for MAH-ESC1)

Extruder having a diameter of 30 mm, 210° C. (for EVOH)

Extruder having a diameter of 40 mm, 230° C. (for PE)

The five-layer sheet obtained above was measured on the interlaminar strength (EPET, g/15 mm) between the PET layer and the MAH-ESC1 layer and the interlaminar strength (FEVOH, g/15 mm) between the EVOH layer and the MAH-ESC1 layer under the same conditions as above. The results are set forth in Table 2.

Example 2

A five-layer sheet was obtained in the same manner as in Example 1, except that a mixture of 40 parts by weight of the MAH-ESC1 and 60 parts by weight of an ethylene/1-butene random copolymer (MFR: 3.6 g/10 min, ethylene content: 85% by mol, density: 0.89 g/cm$^3$, crystallinity: 15%, referred to as "EBR" hereinafter) was used in place of the MAH-ESC1. Then, the five-layer sheet was subjected to the same T-peel test as in Example 1. The results are set forth in Table 1 and Table 2.

Example 3

A five-layer sheet was obtained in the same manner as in Example 1, except that a mixture of 70 parts by weight of the MAH-ESC1 and 30 parts by weight of an ethylene/vinyl acetate copolymer (MFR: 2.5 g/10 min, vinyl acetate content: 25% by mol, referred to as "EVA" hereinafter) was used in place of the MAH-ESC1. Then, the five-layer sheet was subjected to the same T-peel test as in Example 1. The results are set forth in Table 1 and Table 2.

Example 4

A five-layer sheet was obtained in the same manner as in Example 1, except that a mixture of 35 parts by weight of the MAH-ESC1, 45 parts by weight of the EBR and 20 parts by weight of the EVA was used in place of the MAH-ESC1. Then, the five-layer sheet was subjected to the same T-peel test as in Example 1. The results are set forth in Table 1 and Table 2.

Example 5

A five-layer sheet was obtained in the same manner as in Example 1, except that a mixture of 60 parts by weight of the MAH-ESC1, 15 parts by weight of the EBR and 20 parts by weight of the EVA (i.e., 63.2 parts by weight of MAH-ESC1, 15.8 parts by weight of EBR and 21.0 parts by weight of EVA based on 100 parts by weight of the composition)

was used in place of the MAH-ESC1. Then, the five-layer sheet was subjected to the same T-peel test as in Example 1. The results are set forth in Table 1.

Example 6

A five-layer sheet was obtained in the same manner as in Example 1, except that the MAH-ESC2 prepared in Preparation 2 was used in place of the MAH-ESC1 prepared in Preparation 1. Then, the five-layer sheet was subjected to the same T-peel test as in Example 1. The results are set forth in Table 1 and Table 2.

Comparative Example 1

A five-layer sheet was obtained in the same manner as in Example 1, except that graft-modified polypropylene (referred to as "MAH-PP" hereinafter) obtained by graft-modifying polypropylene (MFR: 12 g/10 min, density: 0.91 g/cm$^3$) with 5 parts by weight of maleic anhydride was used in place of the MAH-ESC1. Then, the five-layer sheet was subjected to the same T-peel test as in Example 1. The results are set forth in Table 1.

Comparative Example 2

A five-layer sheet was obtained in the same manner as in Example 1, except that graft-modified polyethylene (referred to as "MAH-PE" hereinafter) obtained by graft-modifying polyethylene (melt index at 190° C.: 2 g/10 min, density: 0.92 g/cm$^3$, butene content: 4% by mol) with 5 parts by weight of maleic anhydride was used in place of the MAH-ESC1. Then, the five-layer sheet was subjected to the same T-peel test as in Example 1. The results are set forth in Table 1.

Comparative Example 3

A five-layer sheet was obtained in the same manner as in Example 1, except that a graft-modified copolymer (referred to as "MAH-SEBS" hereinafter) obtained by graft-modifying an ethylene/styrene/1-butene copolymer (trade name: Crayton G 1652, available from Shell Chemicals, Co., referred to as "SEBS" hereinafter) with 5 parts by weight of maleic anhydride was used in place of the MAH-ESC1. Then, the five-layer sheet was subjected to the same T-peel test as in Example 1. The results are set forth in Table 1.

TABLE 1

|  | Component ratio of adhesive resin composition (part(s) by weight) |  | PC/EVOH multi-layer sheet ||||||
|  |  |  | FPC (g/15 mm-width) ||| FEVOH (g/15 mm-width) |||
|  |  |  | 23° C. | 80° C. | 23° C. after retorting treatment | 23° C. | 80° C. | 23° C. after retorting treatment |
| --- | --- | --- | --- | --- | --- | --- | --- | --- |
| Ex. 1 | MAH-ESC 1 | 100 | 900 | 800 | 400 | 950 | 700 | 950 |
| Ex. 2 | MAH-ESC 1<br>EBR | 40<br>60 | 1000 | 700 | 300 | 900 | 600 | 300 |
| Ex. 3 | MAH-ESC 1<br>EVA | 70<br>30 | 1100 | 600 | 450 | 1000 | 500 | 430 |
| Ex. 4 | MAH-ESC 1<br>EBR<br>EVA | 35<br>45<br>20 | 1200 | 600 | 350 | 1000 | 500 | 320 |
| Ex. 5 | MAH-ESC 1<br>EBR<br>EVA | 63.2<br>15.8<br>21.0 | 900 | 700 | 450 | 800 | 600 | 420 |
| Ex. 6 | MAH-ESC 2 | 100 | 880 | 770 | 370 | 920 | 680 | 320 |
| Comp. Ex. 1 | MAH-PP | 100 | 200 | 100 | 80 | 1100 | 800 | 600 |
| Comp. Ex. 2 | MAH-PE | 100 | 300 | 250 | 30 | 1000 | 600 | 200 |
| Comp. Ex. 3 | MAH-SEBS | 100 | 1000 | 300 | 100 | 900 | 200 | 30 |

TABLE 2

|  | Component ratio of adhesive resin composition (part(s) by weight) |  | PC/EVOH multi-layer sheet ||||||
|  |  |  | FPC (g/15 mm-width) ||| FEVOH (g/15 mm-width) |||
|  |  |  | 23° C. | 80° C. | 23° C. after retorting treatment | 23° C. | 80° C. | 23° C. after retorting treatment |
| --- | --- | --- | --- | --- | --- | --- | --- | --- |
| Ex. 1 | MAH-ESC 1 | 100 | 800 | 700 | 350 | 1000 | 700 | 330 |
| Ex. 2 | MAH-ESC 1<br>EBR | 40<br>60 | 1100 | 800 | 400 | 900 | 550 | 320 |
| Ex. 3 | MAH-ESC 1<br>EVA | 70<br>30 | 1200 | 650 | 430 | 1050 | 550 | 400 |
| Ex. 4 | MAH-ESC 1<br>EBR<br>EVA | 35<br>45<br>20 | 850 | 650 | 400 | 850 | 650 | 400 |
| Ex. 6 | MAH-ESC 2 | 100 | 780 | 670 | 330 | 970 | 680 | 310 |

What is claimed is:

1. An adhesive resin composition containing at least a partially or wholly graft-modified α-olefin/aromatic vinyl compound random copolymer having a graft quantity of an unsaturated carboxylic acid or its derivative ranging from 0.01 to 30% by weight.

2. An adhesive resin composition comprising:

(A) a partially or wholly graft-modified α-olefin/aromatic vinyl compound random copolymer having a graft quantity of an unsaturated carboxylic acid or its derivative ranging from 0.01 to 30% by weight, in an amount of 1 to 80 parts by weight, and (B) at least one soft polymer selected from an ethylene/α-olefin copolymer, in which the molar ratio of constituent units derived from ethylene to constituent units derived from an α-olefin of 3 to 20 carbon atoms is in the range of 45/55 (ethylene/α-olefin) to 95/5, and an ethylene/vinyl acetate copolymer having a vinyl acetate content of 5 to 40% by weight, in an amount of 20 to 99 parts by weight, the total amount of said components (A) and (B) being 100 parts by weight.

3. The adhesive resin composition as claimed in claim 2, wherein said composition further contains an ethylene polymer or its modified product, and/or a propylene polymer or its modified product, in an amount of 0.1 to 50 parts by weight based on 100 parts by weight of the total amount of the partially or wholly modified α-olefin/aromatic vinyl compound random copolymer (A) and the soft polymer (B).

4. An adhesive resin composition for retort packaging material or hot fill packaging material, comprising the adhesive resin composition as claimed in any one of claims 1 to 3.

5. A laminate comprising:

(I) a polyester resin layer, (II) an adhesive layer formed from the adhesive resin composition as claimed in any one of claims 1 to 3, and (III) a saponified olefin/vinyl acetate copolymer layer.

6. A laminate comprising:

(I) a polycarbonate layer, (II) an adhesive layer formed from the adhesive resin composition as claimed in any one of claims 1 to 3, and (III) a saponified olefin/vinyl acetate copolymer layer.

7. A retort packaging material or a hot fill packaging material formed from the laminate as claimed in claim 5 or claim 6.

* * * * *

UNITED STATES PATENT AND TRADEMARK OFFICE
CERTIFICATE OF CORRECTION

PATENT NO. : 6,015,625
DATED : January 18, 2000
INVENTOR(S) : Kenichi Morizono, Keiji Okada, Hiromi Shigemoto, Hideshi Kawachi It is certified that error appears in the above-indentified patent and that said Letters Patent is hereby corrected as shown below:

Column 1, immediately following the Title of the Invention and before line 5, insert, --CROSS-REFERENCE TO RELATED APPLICATION This application is the National Phase entry, under 35 U.S.C. 371, of International Application PCT/JP98/00213, filed January 21, 1998.--

Column 1, change "[22] PCT Filed: Jan. 27, 1998" to --[22] PCT Filed: Jan. 21, 1998--.

Signed and Sealed this

Fourteenth Day of November, 2000

Attest:

Q. TODD DICKINSON

*Attesting Officer*     *Director of Patents and Trademarks*

UNITED STATES PATENT AND TRADEMARK OFFICE
CERTIFICATE OF CORRECTION

PATENT NO. : 6,015,625
DATED : January 18, 2000
INVENTOR(S) : Kenichi Morizono, et al.

It is certified that error appears in the above-identified patent and that said Letters Patent is hereby corrected as shown below:

Column 5 and 6,
Please delete lines 61-67 and lines 1-22, and in line 23 delete the words "nylsilylene or methylphenylsilylene".

Column 6,
After line 51, please insert the following paragraphs:

-- Examples of the ligands having a cyclopentadienyl skeleton include alkyl or cycloalkyl substituted cyclopentadienyl groups, such as cyclopentadienyl, methylcyclopentadienyl, ethylcyclopentadienyl, n– or i-propylcyclopentadienyl, n-, i-, sec– or t-butyl-cyclopentadienyl, hexylcyclopentadienyl, octylcyclopentadienyl, dimethylcyclopentadienyl, trimethylcyclopentadienyl, tetramethylcyclopentadienyl, methylpropylcyclopentadienyl, methylbutyl cyclopentadienyl, methylhexylcyclopentadienyl, methylbenzylcyclopentadienyl, ethylbutylcyclopentadienyl, ethylhexylcyclopentadienyl and methylcyclohexylcyclopentadienyl.

Further, an indenyl group, a 4,5,6,7-tetrahydroindenyl group and a fluorenyl group can be also mentioned.

After line 51,

Those groups may be substituted with halogen atoms or trialkylsilyl groups.

Of the above ligands, particularly preferred are alkyl substituted cyclopentadienyl groups.

UNITED STATES PATENT AND TRADEMARK OFFICE
CERTIFICATE OF CORRECTION

PATENT NO. : 6,015,625
DATED : January 18, 2000
INVENTOR(S) : Kenichi Morizono, et al.

It is certified that error appears in the above-identified patent and that said Letters Patent is hereby corrected as shown below:

When the compound represented by the formula (1) has two or more ligands L having a cyclopentadienyl skeleton, two of the ligands having a cyclopentadienyl skeleton may be bonded to each other through an alkylene group such as ethylene or propylene, a substitute alkylene group such as isopropylene and diphenylmethylene, a silylene group, or a substituted silylene group such as dimethylsilylene, diphenylsilylene or methylphenylsilylene. --

Signed and Sealed this

Thirteenth Day of November, 2001

Attest:

NICHOLAS P. GODICI
*Attesting Officer*     *Acting Director of the United States Patent and Trademark Office*